US008034878B2

(12) United States Patent
Karjala et al.

(10) Patent No.: US 8,034,878 B2
(45) Date of Patent: Oct. 11, 2011

(54) LOW MOLECULAR WEIGHT ETHYLENE INTERPOLYMERS, METHODS OF MAKING, AND USES THEREOF

(75) Inventors: Teresa P. Karjala, Lake Jackson, TX (US); Selim Yalvac, Pearland, TX (US); Cynthia L. Rickey, Lake Jackson, TX (US); Sylvie Desjardins, Lake Jackson, TX (US); Marc A. Springs, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 266 days.

(21) Appl. No.: 12/159,514

(22) PCT Filed: Dec. 12, 2006

(86) PCT No.: PCT/US2006/047296
§ 371 (c)(1),
(2), (4) Date: Jul. 22, 2008

(87) PCT Pub. No.: WO2007/078697
PCT Pub. Date: Jul. 12, 2007

(65) Prior Publication Data
US 2008/0306217 A1    Dec. 11, 2008

Related U.S. Application Data

(60) Provisional application No. 60/754,908, filed on Dec. 29, 2005.

(51) Int. Cl.
*C08L 23/00* (2006.01)
*C08L 23/04* (2006.01)
*C08L 23/10* (2006.01)
(52) U.S. Cl. ........................................ 525/191; 525/240
(58) Field of Classification Search ............... 525/191, 525/240
See application file for complete search history.

(56) References Cited

U.S. PATENT DOCUMENTS

| 3,390,141 A | 6/1968 | Richards |
| 5,180,872 A | 1/1993 | Starzewski |
| 5,433,757 A | 7/1995 | Song et al. |
| 5,629,434 A | 5/1997 | Cusumano et al. |
| 6,100,224 A | 8/2000 | Peiffer et al. |
| 6,794,514 B2 | 9/2004 | Brummer et al. |
| 6,875,816 B2 | 4/2005 | DeGroot et al. |
| 7,259,219 B2 | 8/2007 | Rosen et al. |
| 7,531,601 B2 | 5/2009 | Karjala et al. |
| 2003/0065097 A1 | 4/2003 | DeGroot et al. |
| 2003/0088037 A1 | 5/2003 | Stevens et al. |
| 2003/0232717 A1 | 12/2003 | Brummer et al. |
| 2004/0214714 A1 | 10/2004 | Brummer et al. |
| 2004/0214717 A1 | 10/2004 | Brummer et al. |
| 2005/0187350 A1 | 8/2005 | Stevens et al. |
| 2005/0187351 A1 | 8/2005 | Stevens et al. |

FOREIGN PATENT DOCUMENTS

| EP | 0526943 A1 | 2/1993 |
| WO | WO-0236651 A1 | 5/2002 |
| WO | WO-02074816 A2 | 9/2002 |
| WO | WO-02074817 A2 | 9/2002 |
| WO | WO-03087177 A2 | 10/2003 |
| WO | WO-03087178 A1 | 10/2003 |
| WO | WO-2004031292 A2 | 4/2004 |
| WO | WO-2004035680 A1 | 4/2004 |
| WO | WO-2005100501 A1 | 10/2005 |
| WO | WO-2005111145 A1 | 11/2005 |
| WO | WO-2007008765 A2 | 1/2007 |

OTHER PUBLICATIONS

Carlini et al., Polymer 42 (2001) 5069-5078 entitled: "The copolymerization of styrene with a-olefins by conventional Ziegler-Natta catalysts has been reported to occur with severe limitations."
Pellecchia et al., Macromolecules, 2000, 33, 2807-2814.

*Primary Examiner* — Nathan M Nutter

(57) ABSTRACT

The invention provides a comprising one or more ethylene interpolymers, and wherein the interpolymers, or the composition, has a melt viscosity from 1 to 30,000 cP at 177° C., and wherein at least one ethylene interpolymer has an Rv from 0.3 to 0.99. The invention further provides a composition comprising at least one low molecular weight (LMW) ethylene interpolymer, and at least one high molecular weight (HMW) ethylene interpolymer, and wherein the composition has a melt viscosity from 1 to 30,000 cP at 177° C., and wherein the sum of the Rv from the low molecular weight interpolymer and the high molecular weight interpolymer is from 0.3 to 2. The invention further provides for processes of making such compositions, processes for functionalizing the interpolymer(s) of such compositions, and articles comprising at least one component prepared from an inventive composition.

14 Claims, 11 Drawing Sheets

LOW MOLECULAR WEIGHT ETHYLENE INTERPOLYMERS, METHODS OF MAKING, AND USES THEREOF

REFERENCE TO PRIOR APPLICATION

This application claims the benefit of U.S. Provisional Application No. 60/754,908 filed on Dec. 29, 2005, incorporated herein, in its entirety, by reference.

FIELD OF THE INVENTION

The invention relates to compositions comprising one or more ethylene interpolymers. The invention also provides compositions comprising at least one low molecular weight (LMW) ethylene interpolymer, and at least one high molecular weight (HMW) ethylene interpolymer. Such compositions have a melt viscosity from 1 to 30,000 cP at 177° C. In addition these compositions contain relatively high levels of vinyl groups. The invention further provides for processes for making such compositions, processes for functionalizing the interpolymers of such compositions, and for articles prepared from the same.

BACKGROUND OF THE INVENTION

Low molecular weight hydrocarbon polymers are widely used in a variety of applications, such as, in printing inks, processing aids, mould release agents, candles, polishes, and particularly, in coatings and adhesives. In particular, highly crystalline polymers are attracting increasing interest for admixing with other components to produce abrasion-resistant printing inks. These polymers are also used for paint flatting, and for the preparation of emulsifiable waxes for cleaning materials. An important application is in hot melt systems, particularly, hot melt coatings and hot melt adhesives. In general, paraffin waxes or microcrystalline waxes are used in such hot melt applications, but paraffin waxes and soft microcrystalline waxes both have relatively low melting points. Hard microcrystalline waxes have higher melting points, but are relatively expensive and have high viscosity. In some systems they also give rise to incompatibility problems.

International Publication No. WO 03/087178 discloses an article of manufacture, which comprises a copolymer of ethylene and vinyl aromatic monomer having a molecular weight less than 15,000. Preferably, the copolymer is characterized by a backbone having a first and second terminal end groups. The first terminal end group is a methyl group, and the second terminal end group is a vinyl group, and the ratio of the terminal methyl group to the terminal vinyl group is 0.8:1 to 1:0.8.

U.S. Pat. No. 5,433,757 discloses an oil-soluble fuel and lubricating oil additive, comprising at least one terminally unsaturated ethylene/α-olefin polymer of 300 to 20,000 number average molecular weight, substituted with mono- or dicarboxylic acid producing moieties. The terminal unsaturation comprises terminal ethenylidene unsaturation.

International Publication No. WO 2004/031292 discloses a thermoplastic composition comprising the following: (i) from 1 to 99 percent, by weight, of the total composition, of at least one thermoplastic copolymer, for example, a styrene block copolymer, and (ii) from 1 to 99 percent, by weight, of the total composition, of at least one homogeneously branched ethylene/α-olefin interpolymer, for example, an ethylene/1-octene having a density less than, or equal to, 0.899 g/cc, and a Brookfield viscosity of greater than 500 cP (350° F.).

U.S. Pat. No. 6,100,224 discloses a copolymer comprising units of an unsaturated dicarboxylic monomer and an ethylene/α-olefin macromer. The macromer is an unsaturated ethylene/α-olefin polymer comprising units from ethylene and at least one α-olefin represented by the formula $CH_2=CHR^a$, where $R^a$ is a C1-C18 linear alkyl group or a C3-C18 branched alkyl group. The ethylene/α-olefin polymer has a number average molecular weight from about 500 to 100,000, and at least 30% of the unsaturation in the ethylene/α-olefin polymer is terminal vinylidene.

The copolymer has a carbon-carbon backbone, and contains succinic groups and hydrocarbyl groups. The copolymer can be derivatized by reaction with nucleophilic reactants, including monoamines, polyamines, monoalcohols, polyols, amino alcohols, reactant metal compounds and mixtures thereof. The derivatized copolymers can be post-treated with one or more post-treating agents.

International Publication No. WO 2004/035680 discloses highly filled polymer compositions comprising a low molecular weight ethylene and/or alpha olefin homopolymers and copolymers, or blends thereof, and filled with high concentrations of fillers or additives.

International Publication No. WO 2005/100501 discloses an article comprising a functional component, a tackifier, and an olefin polymer. The olefin polymer comprises one or more C3 to C40 olefins, and optionally, one or more diolefins, and less than 5 mole of ethylene, and has a Dot T-Peel of 1N or more, an $M_w$ of 100,000 or less, a branching index (g') of 0.95 or less, measured at the Mz of the polymer. The functionalization component is selected from functionalized polymers, functionalized oligomers or beta nucleating agents.

U.S. Pat. No. 6,875,816 discloses a composition comprising a high molecular weight, branched component, and a low molecular weight, branched component. Some of the disclosed polymer compositions are characterized by a substantial absent of amyl or methyl branches, and a melt strength (MS) that satisfies the following relationship: $MS \geq x/I_2 + y$.

International Publication No. WO 2002/36651 discloses propylene ethylene copolymers with an ethylene content between 8 and 32 mole percent, and grafted with maleic anhydride and a peroxide. Additional polyolefin-based compositions are disclosed in WO 2005/111145.

There remains a need for lower molecular weight ethylene polymers with the appropriate balance of viscosity and crystallinity for use in coatings, adhesives and other applications. Also, there is a need for functionalized lower molecular weight ethylene polymers with the appropriate balance of viscosity, vinyl content and crystallinity for improved adhesion and other applications. At least some of these needs and others have been met by the following invention.

SUMMARY OF THE INVENTION

The invention provides a composition comprising one or more ethylene interpolymers, and wherein the composition has a melt viscosity from 1 to 30,000 cP at 177° C., and wherein at least one ethylene interpolymer has an Rv from 0.3 to 0.99.

The invention also provides a composition comprising at least one low molecular weight (LMW) ethylene interpolymer, and at least one high molecular weight (HMW) ethylene interpolymer, and wherein the composition has a melt viscosity from 1 to 30,000 cP at 177° C., and wherein the sum of the Rv from the low molecular weight interpolymer and the high molecular weight interpolymer is from 0.3 to 2.

The invention also provides for functionalization products of the inventive compositions.

In addition, the invention provides a process of functionalizing one or more polymers in a composition, said composition comprising at least one low molecular weight (LMW) ethylene interpolymer, and at least one high molecular weight (HMW) ethylene interpolymer, and wherein the composition has a melt viscosity from 1 to 30,000 cP at 177° C., and wherein the sum of the Rv from the low molecular weight interpolymer and the high molecular weight interpolymer is from 0.3 to 2, and wherein said process comprises reacting the least one low molecular weight (LMW) ethylene interpolymer, and/or the at least one high molecular weight (HMW) ethylene interpolymer with at least one functionalization agent.

DETAILED DESCRIPTION OF THE INVENTION

Figure 1:
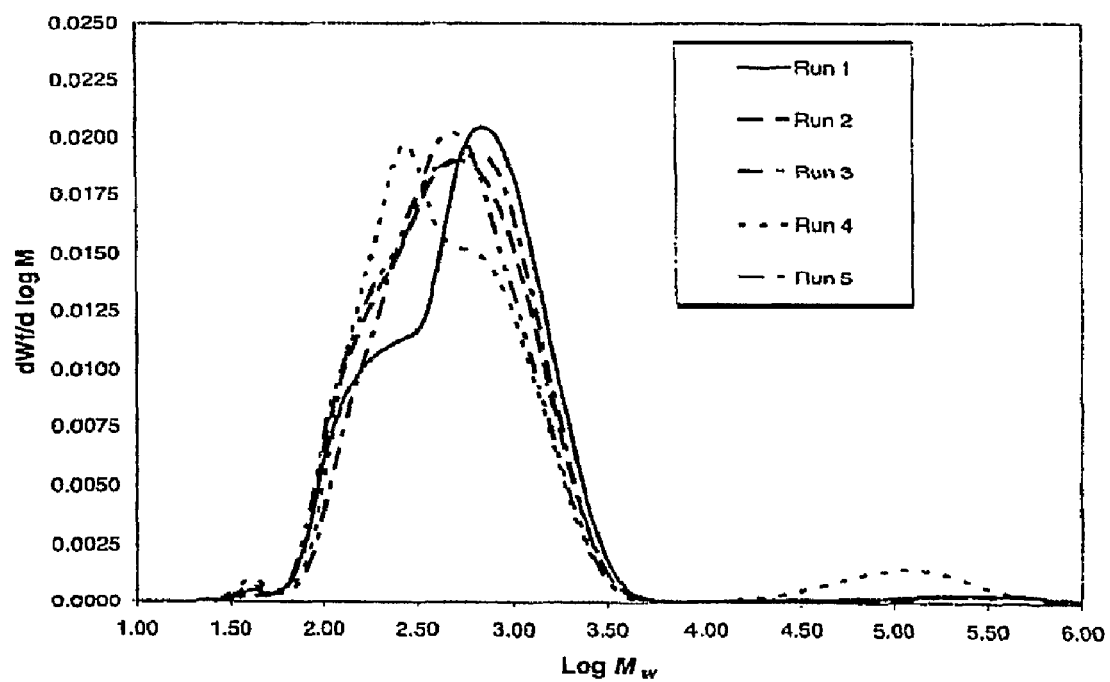
FIG. 1 depicts Gel Permeation Chromatography (GPC) profiles for batch polymerization runs 1-5 (samples B1-B5).

As discussed above, the invention provides for low molecular weight ethylene interpolymers with a high level of vinyl termination, and for compositions containing the same. Such low molecular weight interpolymers can be prepared in a batch reactor or in a continuous process. These interpolymers have viscosities on the order of 1 to 30,000 cP at 177° C. The higher vinyl content allows for higher levels of functionalization of these polymers. The invention also provides for compositions comprising at least one low molecular weight ethylene interpolymer and at least one high molecular weight ethylene interpolymer, as described herein.

More specifically, the invention provides for a composition comprising one or more ethylene interpolymers, and wherein the interpolymers or the composition has a melt viscosity from 1 to 30,000 cP at 177° C., preferably from 2 to 20,000 cP at 177° C., and more preferably from 5 to 10,000 cP at 177° C., and wherein at least one ethylene interpolymer has an Rv from 0.3 to 0.99, preferably from 0.4 to 0.99, and more preferably from 0.5 to 0.99. Preferably the composition has a melt viscosity from 1 to 30,000 cP at 177° C., preferably from 2 to 20,000 cP at 177° C., and more preferably from 5 to 10,000 cP at 177° C.

In another embodiment, the molecular weight distribution, $M_w/M_n$, of the one or more ethylene interpolymers, in total, is from 2 to 100, preferably from 2 to 70.

In another embodiment, the weight average molecular weight of the one or more ethylene interpolymers, in total, is from 500 to 75,000 g/mole, preferably from 1,000 to 50,000 g/mole, and more preferably from 2,000 to 25,000 g/mole. In yet another embodiment, the number average molecular weight of the one or more ethylene interpolymers, in total, is from 100 to 40,000 g/mole, preferably from 100 to 10,000 g/mole, more preferably 200 to 5,000 g/mole.

In another embodiment, the density of the one or more ethylene interpolymers, in total, is from 0.86 g/cc to 0.96 g/cc, preferably from 0.85 g/cc to 0.95 g/cc, and more preferably from 0.84 g/cc to 0.94 g/cc.

In yet another embodiment, the percent crystallinity of the one or more ethylene interpolymers, in total, is from 10 percent to 90 percent, preferably from 20 percent to 85 percent, and more preferably from 30 percent to 80 percent.

In yet another embodiment, the at least one ethylene interpolymer contains from 0.1 weight percent to 50 weight percent of at least one comonomer, preferably from 0.5 weight percent to 25 weight percent of at least one comonomer, more preferably from 1 weight percent to 10 weight percent of at least one comonomer (based on the total weight of polymerizable monomers).

In yet another embodiment, the at least one ethylene interpolymer contains from 0.1 mole percent to 50 mole percent of at least one comonomer preferably from 0.15 mole percent to 25 mole percent of at least one comonomer, more preferably from 0.2 mole percent to 10 mole percent of at least one comonomer (based on the total moles of polymerizable monomers).

In another embodiment of the invention, the comonomer is selected from propylene, 1-butene, 1-pentene, 1-hexene, 3-methyl-1-pentene, 4-methyl-1-pentene, 1-heptene, 1-octene, 1-nonene or 1-decene, and preferably from propylene, 1-butene, 1-hexene or 1-octene. In another embodiment, the at least one ethylene interpolymer does not contain a vinyl aromatic comonomer.

In another embodiment, the composition has a total percent crystallinity according to the following inequality:

Percent crystallinity>614*(density in g/cc)−509, wherein the percent crystallinity is the ((heat of fusion in J/g)/(292 J/g for polyethylene))*100. The density is the density of the composition. In a further embodiment the composition further comprises less than one weight percent of one or more additives, based on the total weight of the composition. In a further embodiment, the one or more additives are one or more stabilizers.

The invention also provides for compositions that contain a combination of two or more embodiments as described herein.

The invention also provides a composition comprising the reaction product of the following: (1) a composition, comprising one or more ethylene interpolymers, and wherein the interpolymers or the composition has a melt viscosity from 1 to 30,000 cP at 177° C., and wherein at least one ethylene interpolymer has an Rv from 0.3 to 0.99, and (2) at least one unsaturated compound containing at least one heteroatom; and wherein the reaction product comprises at least one ethylene interpolymer containing a functional group. In a further embodiment, the functional group is selected from the group consisting of halogen, hydroxyl, anhydride, amine, amide, carboxylic acid, ester, ether, silane and nitrile. Such compositions may contain a combination of two or more embodiments as described herein.

The invention also provides for an article comprising at least one component formed from an inventive composition as described herein. An article may comprise a combination of two or more embodiments as described herein.

The invention also provides for a composition comprising at least one low molecular weight (LMW) ethylene interpolymer, and at least one high molecular weight (HMW) ethylene interpolymer, and wherein the interpolymers or the composition has a melt viscosity from 1 to 30,000 cP at 177° C., preferably from 2 to 20,000 cP at 177° C., and more preferably from 5 to 10,000 cP at 177° C., and wherein the sum of the Rv from the low molecular weight interpolymer and the high molecular weight interpolymer is from 0.3 to 2, preferably from 1 to 2, and more preferably from 1.1 to 1.9, and even more preferably from 1.2 to 1.8. Preferably the composition has a melt viscosity from 1 to 30,000 cP at 177° C., preferably from 2 to 20,000 cP at 177° C., and more preferably from 5 to 10,000 cP at 177° C.

In one embodiment, the at least one low molecular weight (LMW) ethylene interpolymer has a molecular weight distribution, $M_w/M_n$, from 1 to 5, preferably from 1.5 to 4, more preferably from 2 to 3.5, and the at least one high molecular weight (HMW) ethylene interpolymer has a molecular weight distribution, $M_w/M_n$, from 1 to 10, preferably from 2 to 8, and more preferably from 2 to 5.

In another embodiment, the at least one low molecular weight (LMW) ethylene interpolymer has a weight average molecular weight from 100 to 5,000, preferably from 200 to 3,000, and more preferably from 200 to 2,000, and the at least one high molecular weight (HMW) ethylene interpolymer has a weight average molecular weight from 10,000 to 1,000,000 g/mole, preferably from 10,000 to 500,000 g/mole, more preferably from 10,000 to 300,000 g/mole, and even more preferably from 10,000 to 200,000 g/mole.

In another embodiment, the at least one high molecular weight (HMW) ethylene interpolymer has a weight average molecular weight 10,000 to 600,000 g/mole, preferably from 10,000 to 300,000 g/mole, more preferably from 10,000 to 200,000 g/mole, and even more preferably from 10,000 to 100,000 g/mole.

In another embodiment, the at least one low molecular weight (LMW) ethylene interpolymer has a number average molecular weight from 50 to 2,500 g/mole, preferably from 50 to 2,000 g/mole, and more preferably from 100 to 1,000 g/mole, and the at least one high molecular weight (HMW) ethylene interpolymer has a number average molecular weight 5,000 to 500,000 g/mole, preferably from 5,000 to 100,000 g/mole, and more preferably from 5,000 to 50,000 g/mole.

In another embodiment, the at least one high molecular weight (HMW) ethylene interpolymer has a number average molecular weight from 5,000 to 500,000 g/mole, preferably from 5,000 to 300,000 g/mole, preferably from 10,000 to 100,000 g/mole.

In another embodiment, the at least one low molecular weight (LMW) ethylene interpolymer has an Rv from 0.7 to 0.99, preferably from 0.8 to 0.98, and more preferably from 0.9 to 0.98, and the at least one high molecular weight (HMW) ethylene interpolymer has an Rv from 0.2 to 0.8, preferably from 0.3 to 0.7. In another embodiment, the ratio of the "Rv of the at least one low molecular weight (LMW) ethylene interpolymer" to the "Rv of the at least one high molecular weight (HMW) ethylene interpolymer" is from 1:1 to 5:1, preferably from 1:1 to 4:1, and more preferably from 1:1 to 3:1.

In another embodiment, the at least one low molecular weight (LMW) ethylene interpolymer contains from 0.2 to 20 weight percent, preferably from 0.5 to 10 weight percent, of at least one comonomer (based on the total weight of polymerizable monomers for the LMW), and the at least one high molecular weight (HMW) ethylene interpolymer contains from 0.1 to 40 weight percent, preferably from 1 to 30 weight percent, and more preferably from 4 to 30 weight percent, of at least one comonomer (based on the total weight of polymerizable monomers for the HMW).

In yet another embodiment, the at least one low molecular weight (LMW) ethylene interpolymer contains from 0.1 mole percent to 20 mole percent of at least one comonomer (based on the total moles of polymerizable monomers for the LMW), and the at least one high molecular weight (HMW) ethylene interpolymer contains from 0.1 mole percent to 40 mole percent of at least one comonomer (based on the total moles of polymerizable monomers for the HMW). In yet another embodiment, the at least one low molecular weight (LMW) ethylene interpolymer contains from 0.5 mole percent to 10 mole percent of at least one comonomer (based on the total moles of polymerizable monomers for the LMW), and the at least one high molecular weight (HMW) ethylene interpolymer contains from 4 mole percent to 30 mole percent of at least one comonomer (based on the total moles of polymerizable monomers for the HMW).

In another embodiment of the invention, each comonomer is independently selected from propylene, 1-butene, 1-pentene, 1-hexene, 3-methyl-1-pentene, 4-methyl-1-pentene, 1-heptene, 1-octene, 1-nonene or 1-decene, and preferably from propylene, 1-butene, 1-hexene or 1-octene.

In another embodiment, the at least one low molecular weight ethylene interpolymer does not contain a vinyl aromatic comonomer. In another embodiment, the at least one high molecular weight ethylene interpolymer does not contain a vinyl aromatic comonomer. In another embodiment, the both the low molecular weight ethylene interpolymer and the high molecular weight ethylene interpolymer do not contain a vinyl aromatic comonomer.

In another embodiment, the high molecular weight ethylene interpolymer is present in a lower amount than the low molecular weight ethylene interpolymer. In a further embodiment, the high molecular weight ethylene interpolymer contains a higher amount of comonomer incorporation.

In another embodiment of the invention, the at least one low molecular weight (LMW) ethylene interpolymer has a lower percentage of comonomer incorporation than the at least one high molecular weight (HMW) ethylene interpolymer. In a further embodiment, the composition comprises less than, or equal to, 10 weight percent, preferably less than, or equal to 5 weight percent, of the high molecular weight (HMW) ethylene interpolymer, based on the total weight of the composition. The invention also provides for compositions that contain a combination of two or more embodiments as described herein.

In another embodiment, the inventive compositions have a percent crystallinity according to the following inequality: Percent crystallinity>614*(density in g/cc)−509, wherein the percent crystallinity is the ((heat of fusion in J/g)/(292 J/g for polyethylene))*100. The density is that of the composition. In a further embodiment the composition further comprises less than one weight percent of one or more additives, based on the total weight of the composition. In a further embodiment, the one or more additives are one or more stabilizers.

The invention also provides for compositions comprising further embodiments or combinations of these embodiments as described herein.

The invention also provides a composition comprising the reaction product of the following: (1) a composition comprising at least one low molecular weight (LMW) ethylene interpolymer, and at least one high molecular weight (HMW) ethylene interpolymer, and wherein the interpolymers or the composition has a melt viscosity from 1 to 30,000 cP at 177° C., and wherein the sum of the Rv from the low molecular weight interpolymer and the high molecular weight interpolymer is from 0.3 to 2, and (2) at least one unsaturated compound containing at least one heteroatom.

In further embodiment of the invention, the at least one low molecular weight ethylene interpolymer and/or the at least one high molecular weight ethylene interpolymer is (are) functionalized with at least one unsaturated compound containing at least one heteroatom. In another embodiment of the invention, the at least one low molecular weight ethylene interpolymer is functionalized with at least one unsaturated compound containing at least one heteroatom.

In yet another embodiment, the at least one low molecular weight ethylene interpolymer and/or the at least one high molecular weight ethylene interpolymer is (are) functionalized with at least one carbonyl-containing compound. In another embodiment of the invention, the at least one low molecular weight ethylene interpolymer is functionalized with at least one carbonyl-containing compound.

In another embodiment of the invention, the at least one low molecular weight ethylene interpolymer and/or the at least one high molecular weight ethylene interpolymer is (are) functionalized with at least one silane compound. In another embodiment of the invention, the at least one low molecular weight ethylene interpolymer is functionalized with at least one silane compound.

The functionalized compositions may contain a combination of two or more embodiments as described herein.

The invention also provides for an article comprising at least one component formed from an inventive composition as described herein. An inventive article may comprise a combination of two or more embodiments as described herein.

The invention also provides a process for functionalizing one or more polymers in a composition, said composition comprising at least one low molecular weight (LMW) ethylene interpolymer, and at least one high molecular weight (HMW) ethylene interpolymer, and wherein the interpolymers or the composition has a melt viscosity from 1 to 30,000 cP at 177° C., and wherein the sum of the Rv for the low molecular weight interpolymer and the high molecular weight interpolymer is from 1 to 2, and wherein said process comprises reacting the least one low molecular weight (LMW) ethylene interpolymer, and/or the at least one high molecular weight (HMW) ethylene interpolymer with at least one functionalization agent.

In one embodiment, the at least one functionalization agent is one of the following: a halogen or a halogen-containing compound, an epoxide-containing compound, a carbonyl-containing compound, a sulfonyl-containing compound, or a silane compound.

In a further embodiment, the sum of the Rv for the low molecular weight interpolymer and the high molecular weight interpolymer is from 1 to 1.9, and preferably from 1.2 to 1.8.

The invention also provides for processes for functionalizing the inventive compositions comprising further embodiments or combinations of the embodiments as described herein.

The invention also provides a process for preparing a composition comprising at least one low molecular weight (LMW) ethylene interpolymer, and at least one high molecular weight (HMW) ethylene interpolymer, and wherein said process comprises polymerizing ethylene and at least one other monomer in the presence of catalyst system as described herein.

The invention also provides for processes of preparing the inventive compositions, comprising further embodiments or combinations of the embodiments as described herein.

Additional embodiments of the invention and the advantages of the invention are apparent with the following description.

Composition I

The inventive composition contains one or more ethylene interpolymers. The interpolymers or the composition has a melt viscosity from 1 cP to 30,000 cP, preferably 2 cP to 20,000 cP, and more preferably from 5 cP to 10,000 cP at 177° C. All individual values and subranges from 1 cP to 30,000 cP are included herein and disclosed herein. Melt viscosity is measured using a Brookfield viscometer at 177° C. (350° F.).

In another embodiment, the interpolymers or the composition has a melt viscosity from 1 cP to 60,000 cP, preferably 2 cP to 40,000 cP, and more preferably from 5 cP to 20,000 cP at 149° C. All individual values and subranges from 1 cP to 60,000 cP are included herein and disclosed herein. Melt viscosity is measured using a Brookfield viscometer at 149° C. (300° F.).

In another embodiment, the composition contains at least one ethylene interpolymer that has an Rv value from 0.3 to 0.99, preferably from 0.4 to 0.99, and more preferably from 0.5 to 0.99. All individual values and subranges from 0.3 to 0.99 are included herein and disclosed herein.

In another embodiment, the composition contains from 15 to 60 vinyl groups per 1000 carbon atoms, preferably from 20 to 55 vinyl groups per 1000 carbon atoms, and more preferably from 25 to 50 vinyl groups per 1000 carbon atoms. All individual values and subranges from 15 to 60 vinyl groups per 1000 carbon atoms are included herein and disclosed herein.

In another embodiment, the molecular weight distribution, $M_w/M_n$, of the one or more ethylene interpolymers of the composition is from 2 to 100, preferably from 2 to 80, and more preferably from 2 to 70. All individual values and subranges from 2 to about 100 are included herein and disclosed herein.

In another embodiment, the weight average molecular weight, $M_w$, of the one or more ethylene interpolymers of the composition is from 500 to 75,000 g/mole, preferably from 1,000 to 50,000 g/mole, and more preferably from 2,000 to 25,000 g/mole. All individual values and subranges from 500 to about 75,000 g/mole are included herein and disclosed herein.

In another embodiment, the number average molecular weight, $M_n$, of the one or more ethylene interpolymers of the composition is from 100 to 40,000 g/mole, preferably from 100 to 10,000 g/mole, more preferably from 200 to 5,000 g/mole, and even more preferably from 250 to 3000 g/mole, and most preferably from 200 to 2000 g/mole, or from 200 to 1000 g/mole. All individual values and subranges from 100 to 40,000 g/mole are included herein and disclosed herein.

In another embodiment, the density of the one or more ethylene interpolymers of the composition is from 0.86 g/cc to 0.96 g/cc, preferably from 0.87 g/cc to 0.95 g/cc, and more preferably from 0.88 g/cc to 0.94 g/cc. All individual values and subranges from 0.86 g/cc to 0.96 g/cc are included herein and disclosed herein.

In another embodiment, the density of the one or more ethylene interpolymers of the composition is less than 0.93 g/cc, preferably less than 0.92 g/cc, and more preferably less than 0.91 g/cc or less than 0.90 g/cc. In another embodiment, the density of the one or more ethylene interpolymers is greater than 0.86 g/cc, preferably greater than 0.87 g/cc, and more preferably greater than 0.88 g/cc.

In another embodiment, the percent crystallinity of the one or more ethylene interpolymers of the composition is from 10 percent to 90 percent, preferably from 20 percent to 85 percent, and more preferably from 30 percent to 80 percent. All individual values and subranges from 10 percent to 90 percent are included herein and disclosed herein.

In another embodiment, the percent crystallinity of the one or more ethylene interpolymers of the composition is greater than 30 percent, preferably greater than 35 percent, and more preferably greater than 40 percent.

In another embodiment, the one or more ethylene interpolymers of the composition have at least one melting temperature, $T_m$, from 60° C. to 120° C., preferably from 70° C. to 110° C., and more preferably from 80° C. to 100° C. All individual values and subranges from 60° C. to 120° C. are included herein and disclosed herein.

In another embodiment, the one or more ethylene interpolymers of the composition have at least one crystallization temperature, $T_c$, from 50° C. to 110° C., preferably from 60° C. to 100° C., and more preferably from 50° C. to 90° C. All individual values and subranges from 50° C. to 110° C. are included herein and disclosed herein.

In another embodiment, at least one ethylene interpolymer of the composition contains 0.1 weight percent to 50 weight percent of at least one comonomer, and preferably 0.5 weight percent to 25 weight percent, and more preferably 1 weight percent to 15 weight percent (based on the total weight of polymerizable monomers). All individual values and subranges from 0.1 weight percent to 50 weight percent are included herein and disclosed herein.

In another embodiment, at least one ethylene interpolymer of the composition contains 0.1 mole percent to 50 mole percent of at least one comonomer, and preferably 0.15 mole percent to 25 mole percent, and more preferably 0.2 mole percent to 10 mole percent, and even more preferably 0.2 mole percent to 5 mole percent (based on the total moles of polymerizable monomers). All individual values and subranges from 0.1 mole percent to 50 mole percent are included herein and disclosed herein.

Preferred comonomers include, but are not limited to, propylene, 1-butene, 1-pentene, 1-hexene, 3-methyl-1-pentene, 4-methyl-1-pentene, and 1-octene, dienes and polyenes. Examples of suitable dienes include butadienes, isoprenes, pentadienes, hexadienes (e.g., 1,4-hexadiene) and octadienes. Additional comonomers include styrene, halo-substituted styrene, alkyl-substituted styrene, tetrafluoroethylenes, vinylbenzocyclobutene, cycloalkenes (for example, cyclopentene, cyclohexene, cyclooctene), and mixtures thereof. Typically and preferably, the ethylene is copolymerized with one or more C3-C20 α-olefin, and more preferably with one or more C3-C8 α-olefins. Preferred α-olefins include propylene, 1-butene, 1-hexene and 1-octene. In one embodiment, the comonomer is not an aromatic vinyl monomer.

The invention also provides compositions containing two or more combinations of the above embodiments.

Composition II (LMW Interpolymer and HMW Interpolymer)

In another aspect of the invention, the composition comprises at least one low molecular weight ethylene interpolymer and at least one high molecular weight ethylene interpolymer. The interpolymers, or the composition, have a melt viscosity from 1 cP to 30,000 cP, preferably from 2 cP to 20,000 cP, and more preferably from 5 cP to 10,000 cP at 177° C. All individual values and subranges from 1 cP to 30,000 cP are included herein and disclosed herein. Melt viscosity is measured using a Brookfield viscometer at 177° C. (350° F.).

In another embodiment, the interpolymers, or the composition, have a melt viscosity from 1 cP to 60,000 cP, preferably from 2 cP to 40,000 cP, and more preferably from 5 cP to 20,000 cP at 149° C. All individual values and subranges from 1 cP to 60,000 cP are included herein and disclosed herein. Melt viscosity is measured using a Brookfield viscometer at 149° C. (300° F.).

In another embodiment, the sum of the Rv from the low molecular weight interpolymer and the high molecular weight interpolymer is from 0.3 to 2, preferably from 1 to 2, more preferably from 1.1 to 1.9, and even more preferably from 1.2 to 1.8. All individual values and subranges from 0.3 to 2 are included herein and disclosed herein.

In another embodiment, the combined density of the low molecular weight ethylene interpolymer and the high molecular weight ethylene interpolymer is from 0.86 g/cc to 0.96 g/cc, preferably from 0.87 g/cc to 0.95 g/cc, and more preferably from 0.88 g/cc to 0.94 g/cc. All individual values and subranges from 0.86 g/cc to 0.96 g/cc are included herein and disclosed herein. In another embodiment, the density is less than 0.93 g/cc, preferably less than 0.92 g/cc, and more preferably less than 0.91 g/cc or less than 0.90 g/cc.

In another embodiment, the ratio of the "Rv of the at least one low molecular weight (LMW) ethylene interpolymer" to the "Rv of the at least one high molecular weight (HMW) ethylene interpolymer" is from 1:1 to 5:1, preferably from 1:1 to 4:1, and more preferably from 1:1 to 3:1, and even more preferably from 1:1 to 2:1. All individual values and subranges from 1:1 to 5:1 are included herein and disclosed herein. In another embodiment, this ratio is greater than 1, preferably greater than 2.0, and more preferably greater than 2.2.

In another embodiment, the low molecular weight ethylene interpolymer contains Rv from 0.7 to 0.99, preferably 0.8 to 0.98, and more preferably from 0.85 to 0.97. All individual values and subranges of Rv from 0.7 to 0.99 are included herein and disclosed herein.

In another embodiment, the low molecular weigh ethylene interpolymer has a molecular weight distribution, $M_w/M_n$, from 1 to 5, preferably from 1.5 to 4, and more preferably from 2 to 3.5, or from 2 to 3. All individual values and subranges from 1 to 5 are included herein and disclosed herein.

In another embodiment, the low molecular weight ethylene interpolymer has a weight average molecular weight, $M_w$, from 100 to 5,000 g/mol, and preferably from 200 to 3,000 g/mol, and more preferably from 200 to 2,000 g/mol, or from 200 to 1,000 g/mole. All individual values and subranges from 100 to about 5,000 g/mol are included herein and disclosed herein.

In another embodiment, the low molecular weight ethylene interpolymer has a number average molecular weight, $M_n$, from 50 to 2500 g/mol, preferably from 50 to 2,000 g/mol, more preferably from 100 to 1,000 g/mol, and even more preferably from 200 to 800 g/mol. All individual values and subranges from 50 to 2,500 g/mol are included herein and disclosed herein.

In another embodiment, the low molecular weight ethylene interpolymer contains from 0.2 weight percent to 20 weight percent of at least one comonomer, and preferably from 0.5 weight percent to 15 weight percent, and more preferably from 1 weight percent to 10 weight percent (based on the total weight of polymerizable monomers). All individual values and subranges from 0.2 weight percent to 20 weight percent are included herein and disclosed herein.

In another embodiment, the low molecular weight ethylene interpolymer contains from 0.1 mole percent to 20 mole percent of at least one comonomer, and preferably from 0.1 mole percent to 10 mole percent, more preferably from 0.5 mole percent to 10 mole percent, and even more preferably 0.2 mole percent to 5 mole percent (based on the total moles of polymerizable monomers). All individual values and subranges from 0.2 mole percent to 20 mole percent are included herein and disclosed herein.

Preferred comonomers include, but are not limited to, propylene, 1-butene, 1-pentene, 1-hexene, 3-methyl-1-pentene, 4-methyl-1-pentene, and 1-octene, non-conjugated dienes, conjugated dienes and polyenes. Suitable dienes include butadienes, isoprenes, pentadienes, hexadienes (e.g., 1,4-hexadiene) and octadienes. Other comonomers include styrene, halo-substituted styrene, alkyl-substituted styrene, tetrafluoroethylenes, vinylbenzocyclobutene, cycloalkenes (for example, cyclopentene, cyclohexene, cyclooctene), and mixtures thereof. Typically and preferably, the ethylene is copolymerized with one C3-C20 α-olefin, and more preferable with one C3-C8 α-olefin. Preferred α-olefins include propylene, 1-butene, 1-hexene and 1-octene. In one embodiment, the comonomer is not an aromatic vinyl monomer.

In another embodiment, the low molecular weight ethylene interpolymer contains from 7 to 50 vinyl groups per 1000 carbon atoms, preferably 10 to 40 vinyl groups per 1000 carbon atoms, and more preferably from 15 to 30 vinyl groups per 1000 carbon atoms. All individual values and subranges from 7 to 50 vinyl groups per 1000 carbon atoms are included herein and disclosed herein.

In another embodiment, the high molecular weight ethylene interpolymer has a molecular weight distribution, $M_w/M_n$, from 1 to 10, and preferably from 2 to 8, and more preferably from 2 to 5. All individual values and subranges from 1 to 10 are included herein and disclosed herein.

In another embodiment, the high molecular weight ethylene interpolymer has a weight average molecular weight, $M_w$, from 10,000 to 1,000,000 g/mole, and preferably from 10,000 to 500,000 g/mole, more preferably from 10,000 to 300,000 g/mole, and even more preferably from 10,000 to 200,000 g/mole, or from 10,000 to 100,000 g/mole. All individual values and subranges from 10,000 to about 1,000,000 g/mol are included herein and disclosed herein.

In another embodiment, the high molecular weight ethylene interpolymer has a number average molecular weight, $M_n$, from 5,000 to 500,000 g/mol, preferably from 5,000 to 300,000 g/mol, more preferably from 5,000 to 250,000 or 200,000 g/mol, and even more preferably from 5,000 to 150,000 g/mol, and most preferably from 5,000 to 100,000 or 50,000 g/mol. All individual values and subranges from 5,000 to 500,000 g/mol are included herein and disclosed herein.

In another embodiment, the high molecular weight ethylene interpolymer contains from 0.1 weight percent to 40 weight percent of at least one comonomer, and preferably from 0.5 weight percent to 30 weight percent, and more preferably from 1 weight percent to 30 weight percent, and even more preferably from 4 weight percent to 30 weight percent (based on total weight of polymerizable monomers). All individual values and subranges from 0.1 weight percent to 40 weight percent are included herein and disclosed herein.

In another embodiment, the high molecular weight ethylene interpolymer contains from 0.1 mole percent to 40 mole percent of at least one comonomer, and preferably from 0.5 mole percent to 30 mole percent, and more preferably from 1 mole percent to 20 mole percent, and even more preferably from 4 mole percent to 20 mole percent (based on total moles of polymerizable monomers). All individual values and subranges from 0.1 mole percent to 40 mole percent are included herein and disclosed herein.

Preferred comonomers include, but are not limited to, propylene, 1-butene, 1-pentene, 1-hexene, 3-methyl-1-pentene, 4-methyl-1-pentene, and 1-octene, non-conjugated dienes, conjugated dienes and polyenes. Suitable dienes include butadienes, isoprenes, pentadienes, hexadienes (e.g., 1,4-hexadiene) and octadienes. Other comonomers include styrene, halo-substituted styrene, alkyl-substituted styrene, tetrafluoroethylenes, vinylbenzocyclobutene, cycloalkenes (for example, cyclopentene, cyclohexene, cyclooctene), and mixtures thereof. Typically and preferably, the ethylene is copolymerized with one C3-C20 α-olefin, and more preferable with one C3-C8 α-olefin. Preferred α-olefins include propylene, 1-butene, 1-hexene and 1-octene. In one embodiment, the comonomer is not an aromatic vinyl monomer.

In another embodiment, the high molecular weight ethylene interpolymer contains Rv from 0.2 to 0.8, preferably from 0.3 to 0.75, and more preferably Rv from 0.3 to 0.7, and even more preferably from 0.3 to 0.6. All individual values and subranges of Rv from 0.2 to 0.85 are included herein and disclosed herein.

In another embodiment, the high molecular weight ethylene interpolymer contains from 0.01 to 5 vinyl groups per 1000 carbon atoms, preferably from 0.02 to 3 vinyl groups per 1000 carbon atoms, and more preferably from 0.05 to 2 vinyl groups per 1000 carbon atoms. All individual values and subranges from 0.01 to 5 vinyl groups per 1000 carbon atoms are included herein and disclosed herein.

In another embodiment, the composition contains 1 weight percent to 10 weight percent of the high molecular weight polymer fraction, preferably from 2 weight percent to 7 weight percent, and more preferably from 3 weight percent to 5 weight percent, based on the total weight of the composition. All individual values and subranges from 1 weight percent to 10 weight percent are included herein and disclosed herein.

In another embodiment, the weight average molecular weight of the high molecular weight ethylene interpolymer is at least 50×, preferably at least 100×, and more preferably at least 150× or at least 200× the weight average molecular weight of the low molecular weight ethylene interpolymer.

The invention also provides compositions containing two or more combinations of the above embodiments.

Additives

The compositions disclosed herein may contain other additives, such as those described in International Publication No. WO 03/087178 (U.S. Publication No. 2005165192), which is incorporated herein by reference, in its entirety. The use of such additives is optional, and will depend on the particular use of the composition and level of performance required. Additives include, but are not limited to, stabilizers, ultraviolet light absorbers, antistatic agents, pigments, dyes, nucleating agents, fillers slip agents, fire retardants, plasticizers, processing aids, lubricants, stabilizers, smoke inhibitors, viscosity control agents and anti-blocking agents.

Additives may be in the form of concentrates that typically comprise from about 70% to about 99.9% by weight of a substantially, inert, normally liquid, organic diluent. Typically, polymers and resins used in the invention are treated with one or more stabilizers, for example, antioxidants, such as Irganox™ 1010 and Irgafos™ 168, both supplied by Ciba Specialty Chemicals. Polymers are typically treated with one or more stabilizers before an extrusion or other melt processes.

Other additives that may optionally be used, include, detergents, dispersants, supplemental viscosity improvers, oxidation inhibiting agents, corrosion inhibiting agents, pour point depressing agents, extreme pressure agents, anti-wear agents, color stabilizers, friction modifiers, and anti-foam agents.

Applications

The low molecular weight polymers disclosed herein have many useful applications, and can be used to make a multitude of articles of manufacture. Articles of manufacture include, but are not limited to, waxes, lubricants, additives, etc., as described in International Publication No. WO 03/087178, which is incorporated, herein, in its entirety, by reference. The inventive low molecular weight polymers may be used in the formulation of paints and coatings, printing inks, carbon paper, photo toners, building and construction materials, mold release agents, hot melt adhesives, and candles. These polymers may also be used in wood processing, metal working, powder metallurgy and sintering, wax modeling, sizing, crop protection, and so on. Due to the presence of the vinyl end groups, the polymers of the inventive compositions may be functionalized by reacting the polymers with a reagent which can react with the vinyl group. Thus, various functionalized low molecular weight polymers are obtained. The functionalized polymers may be further reacted with other compounds or polymers, each containing one or more chemical groups that can react with the functionalized polymers.

The low molecular weight polymers disclosed herein can be used as blend of one or more polymers. The blends may be used to formulate hot melt adhesives, plastic additives, aqueous dispersions, processing aids, lubricants, printing inks, toners, etc. Methods and components for making such products are disclosed, for example, in the following U.S. Pat. Nos. 6,143,846; 5,928,825; 5,530,054; 6,242,148; 6,207,748; 5,998,547; 6,262,153; 5,037,874; 5,482,987; 6,133,490; and 6,080,902; in the following PCT applications: WO 01/44387; WO 01/72855; WO 01/64776; WO 01/56721; WO 01/64799; WO 01/64800; and in the following EP patents or patent applications: EP 890619; EP 916700; and EP 0050313; EP 1081195.

The low molecular weight polymers disclosed herein may also be used as a component in a hot melt adhesive. Generally, hot melt adhesives comprise three components: a polymer, a tackifier, and a low molecular weight polymer. Each component may comprise a blend of two or more components, that is, the polymer component may comprise a blend of two different polymers. The polymer provides cohesive strength to the adhesive bond. The tackifier provides tack to the adhesive which serves to secure the items to be bonded while the adhesive sets, and also reduces the viscosity of the system making the adhesive easier to apply to the substrate. The tackifier may be further used to control the glass transition temperature of the formulation. The low molecular weight polymer controls the open/close times, and reduces the viscosity of the system. Hot melt adhesives may further typically comprise an oil, used as a filler and/or used to reduce the viscosity of the system.

Hot melt adhesives based on conventional polymers include ethylene vinyl acetate copolymers (EVA), atactic polypropylene (APP), amorphous polyolefins, low density polyethylene (LDPE), and homogeneous linear ethylene/alpha-olefin copolymers. Conventional hot melt adhesives typically employ large levels of tackifier to reduce the viscosity of the system to levels which enabled its facile application to the substrate.

Pressure sensitive adhesives are materials which are aggressively and permanently tacky at room temperature, at the time of application, and which firmly adhere to a variety of dissimilar surfaces with the application of light pressure, such as pressing with a finger. Despite their aggressive tackiness, pressure sensitive adhesives may be removed from smooth surfaces without leaving significant residue. Pressure sensitive adhesives are widely used in everyday applications, such as masking tape, clear office tape, labels, decals, bandages, decorative and protective sheets (such as shelf and drawer liners), floor tiles, sanitary napkin/incontinence device placement strips, sun control films, and the joining of gaskets to automobile windows.

Historically, pressure sensitive adhesives were based on natural rubber and wood rosins, which were carried by a solvent. Articles bearing such adhesives were manufactured by applying a solution of the adhesive on a suitable backing, and removing the solvent by a devolatilizing process. However, in response to cost increases in solvents and regulatory restrictions regarding emissions, water-based adhesives and solid-form hot melt adhesives (HMA's) have been developed.

In some embodiments, the ultra-low molecular weight ethylene polymers disclosed herein may be employed as an extending or modifying composition. Ultra-low molecular weight polymers are often employed as either ethylene homopolymers, or interpolymers of ethylene and a comonomer selected from the group consisting of C3-C20 α-olefins, non-conjugated dienes, and cycloalkenes.

The ultra-low molecular weight ethylene α-olefin copolymer may be employed as a tackifier (as described above). Further, as the mole percent of ethylene increases, the crystallinity of the interpolymer will likewise increase. Accordingly, ultra-low molecular weight interpolymers may be useful as waxes to control the open and close time of the adhesive system.

The low molecular weight polymers disclosed herein may also be used to make lubricants or be used as oil additives. Both copolymers and terpolymers can be used. An example of copolymer is an ethylene-octene copolymer; an example of terpolymer is an ethylene-propylene-octene terpolymer. The inventive compositions may also be used as fuel oil compositions. Such compositions typically comprise: (1) a middle fraction fuel oil having a boiling point of 150° C. to 400° C. and (2) an ethylene α-olefin copolymer type "fuel oil fluidity improver" comprising an ethylene α-olefin copolymer which comprises 60 to 90% by mole of constituent units derived from ethylene, and 10 to 40% by mole of constituent units derived from an α-olefin of 3 to 20 carbon atoms and has an intrinsic viscosity [η], as measured in decalin at 135° C., of 0.01 to 1.0 dl/g.

Catalysts

Suitable metal-ligand complexes, which are useful as catalysts for the production of the ethylene interpolymers discussed above, are those generally having two phenol-heterocycle or phenol-triazole ligands attached to the metal center. In other words, there is a 2:1 ligand to metal ratio intended (although such ratio may not be exact). Such metal complexes may be characterized by the following general formula (I):

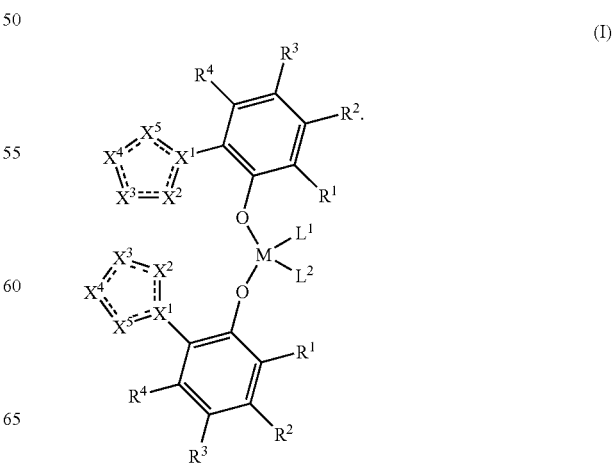

In this formula, X1 and X2 are N, and X3, X4, and X5 are independently selected from the group consisting of N and CR15, and where R15 is selected from the group consisting of hydrogen, alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, halo, silyl, boryl, phosphino, amino, thio, seleno, and combinations thereof, and provided that at least one, and not more than two, of X3, X4, and X5 are N. Optionally, X3 and X4 may be joined to form a fused ring system having up to 50 atoms, not counting hydrogen atoms.

In general, R1, R2, R3 and R4 are independently selected from hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, halo, silyl, boryl, phosphino, amino, thio, seleno, nitro, and combinations thereof; with the exception that R1 may not be hydrogen, and optionally, two or more of R1, R2, R3 and R4 (for example R1 and R2, or R2 and R3, or R3 and R4) may be joined to form a fused ring system having up to 50 atoms, not counting hydrogens. In the above formula, however, R2 and R4 are both hydrogen or are joined in a fused ring system, as described.

In addition, M is zirconium, titanium or hafnium; and L1 and L2 are independently selected from the group consisting of halide, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, thio, boryl, silyl, amino, hydrido, allyl, seleno, phosphino, carboxylates, amines and combinations thereof.

Further descriptions of these catalyst systems are found in U.S. Pat. No. 6,794,514 and U.S. Publication No. 2004/0214714, each incorporated herein, in its entirety, by reference. See also U.S. Publication No. 2004/0214717 and International Publication No. WO 2003/087177.

The following ligands may be used in catalytic systems for the invention:

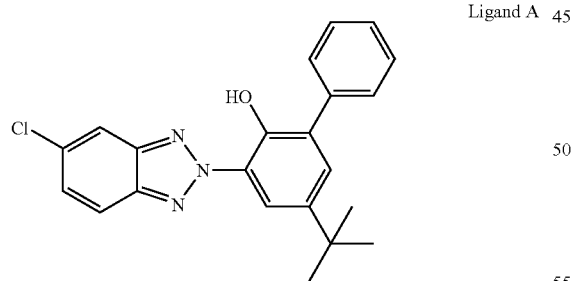

Ligand A

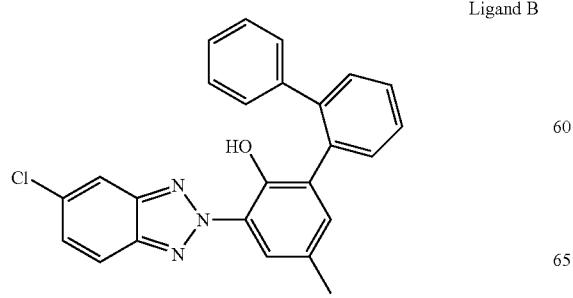

Ligand B

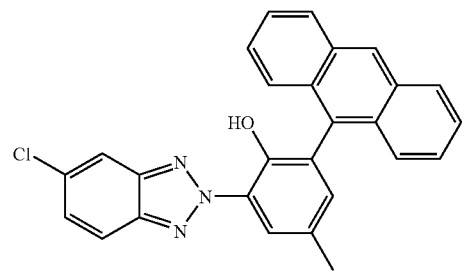

Ligand C

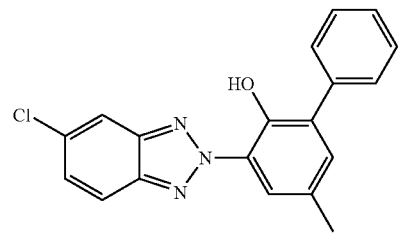

Ligand D

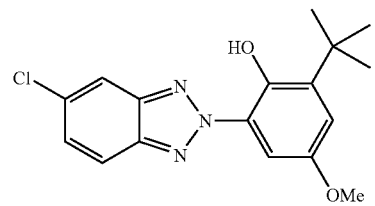

Ligand E

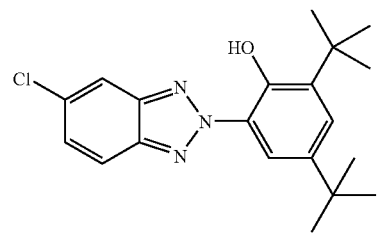

Ligand F

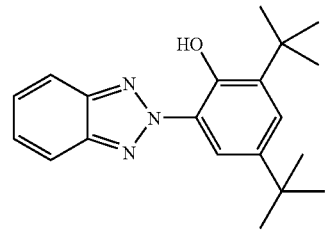

Ligand G

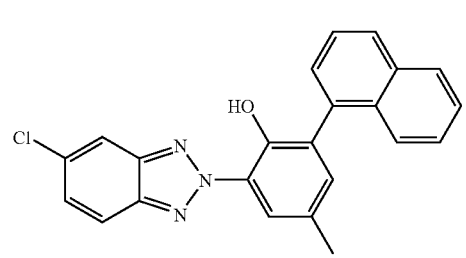

Ligand H

Ligand J

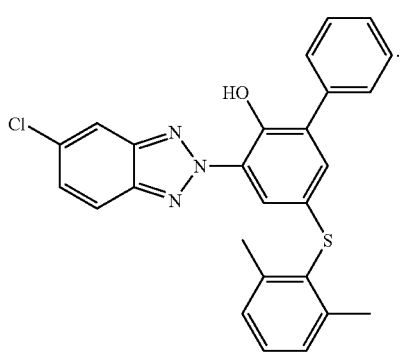

Polymerization Systems

Polymerization can be carried out in the Ziegler-Natta or Kaminsky-Sinn methodology, including temperatures from −100° C. to 300° C., and pressures from atmospheric to 3000 atmospheres. Suspension, solution, slurry, gas phase or high-pressure polymerization processes may be employed with the catalysts and compounds described herein. Such processes can be run in a batch, semi-batch or continuous mode. Examples of such processes are well known in the art. A support for the catalyst may be employed, which may be inorganic (such as alumina, magnesium chloride or silica) or organic (such as a polymer or cross-linked polymer). Methods for the preparation of supported catalysts are known in the art. Slurry, suspension, solution and high-pressure processes as known to those skilled in the art, may also be used with supported catalysts of the invention.

A solution process is specified for certain benefits, with the solution process being run at a temperature above 90° C., more specifically at a temperature above 100° C., further more specifically at a temperature above 110° C., and even further more specifically at a temperature above 130° C. Suitable solvents for polymerization are non-coordinating, inert liquids. Examples include straight and branched-chain hydrocarbons such as isobutane, butane, pentane, isopentane, hexane, isohexane, heptane, octane, Isopar-E® and mixtures thereof; cyclic and alicyclic hydrocarbons such as cyclohexane, cycloheptane, methylcyclohexane, methylcycloheptane, and mixtures thereof; perhalogenated hydrocarbons such as perfluorinated C4-10 alkanes, chlorobenzene, and aromatic and alkylsubstituted aromatic compounds such as benzene, toluene, mesitylene, and xylene. Suitable solvents also include liquid olefins which may act as monomers or comonomers, including ethylene, propylene, 1-butene, butadiene, cyclopentene, 1-hexene, 1-pentene, 3-methyl-1-pentene, 4-methyl-1-pentene, 1,4-hexadiene, 1-octene, 1-decene, isobutylene, divinylbenzene, allylbenzene, and vinyltoluene (including all isomers alone or in admixture). Mixtures of the foregoing are also suitable. Other additives that are useful in a polymerization reaction may be employed, such as scavengers, and promoters.

In some embodiments, the molecular weight of the copolymers or interpolymers are controlled by the amount of hydrogen present in the polymerization reactor. Therefore, when ultra low molecular weight polymers are desired, an excessive amount of hydrogen is used, especially for the substantially random polymers described herein. In other embodiments, certain catalysts are selected such that only low molecular weight polymers are produced without the need for using hydrogen as a molecular weight regulator.

Functionalization

The ethylene interpolymers disclosed herein may be modified by typical grafting, hydrogenation, nitrene insertion, epoxidation, or other functionalization reactions, well known to those skilled in the art. Preferred functionalizations are grafting reactions using a free radical mechanism.

A variety of radically graftable species may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophtbalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

Radically graftable species of the silane class of materials may be attached to the polymer, either individually, or as relatively short grafts. These species include, but are not limited to, vinylalkoxysilanes, such as vinyltrimethoxysilane, vinyltriethoxysilane; vinyltriacetoxysilane; vinyltrichlorosilane, and the like. Generally, materials of this class include, but are not limited to, hydrolyzable groups, such as alkoxy, acyloxy, or halide groups, attached to silicon. Materials of this class also include non-hydrolyzable groups, such as alkyl and siloxy groups, attached to silicon.

Other radically graftable species may be attached to the polymer, individually, or as short-to-longer grafts. These species include, but are not limited to, methacrylic acid; acrylic acid; Diels-Alder adducts of acrylic acid; methacrylates including methyl, ethyl, butyl, isobutyl, ethylhexyl, lauryl, stearyl, hydroxyethyl, and dimethylaminoethyl; acrylates including methyl, ethyl, butyl, isobutyl, ethylhexyl, lauryl, stearyl, and hydroxyethyl; glycidyl methacrylate; trialkoxysilane methacrylates, such as 3-(methacryloxy)propyltrimethoxysilane and 3-(methacryloxy)propyl-triethoxysilane, methacryloxymethyltrimethoxysilane, methacryloxymethyltriethoxysilane; acrylonitrile; 2-isopropenyl-2-oxazoline; styrene; α-methylstyrene; vinyltoluene; dichlorostyrene; N-vinylpyrrolidinone, vinyl acetate, methacryloxypropyltrialkoxysilanes, methacryloxymethyltrialkoxysilanes and vinyl chloride. Preferably methacrylic acid; acrylic acid; Diels-Alder adducts of acrylic acid; methacrylates; acrylates; glycidyl methacrylate; trialkoxysilane methacrylates; acrylonitrile; 2-isopropenyl-2-oxazoline; styrene; α-methylstyrene; vinyltoluene; dichlorostyrene; N-vinylpyrrolidinone, vinyl acetate, methacryloxypropyltrialkoxysilanes, methacryloxymethyltrialkoxysilanes and vinyl chloride.

Mixtures of radically graftable species that comprise at least one of the above species may be used, with styrene/maleic anhydride and styrene/acrylonitrile as illustrative examples.

A thermal grafting process is one method for reaction, however, other grafting processes may be used, such as photo initiation, including different forms of radiation, e-beam, or redox radical generation.

The functionalized interpolymers disclosed herein may also be modified by various chain extending or cross-linking processes, including, but not limited to peroxide-, silane-, sulfur-, radiation-, or azide-based cure systems. A full description of the various cross-linking technologies is described in U.S. Pat. No. 5,869,591 and No. 5,977,271, both of which are herein incorporated by reference in their entirety.

For cured resins, suitable curing agents may include peroxides, phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. Elemental sulfur may be used as a crosslinking agent for diene containing polymers.

In some systems, for example, in silane grafted systems, crosslinking may be promoted with a crosslinking catalyst, and any catalyst that will provide this function can be used in this invention. These catalysts generally include acids and bases, especially organic bases, carboxylic acids and sulfonic acids, and organometallic compounds including organic titanates, organic zirconates, and complexes or carboxylates of lead, cobalt, iron, nickel, zinc and tin. Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, are examples of suitable crosslinking catalysts.

Rather than employing a chemical crosslinking agent, crosslinking may be effected by use of radiation or by the use of electron beam. Useful radiation types include ultraviolet (UV) or visible radiation, beta ray, gamma rays, X-rays, or neutron rays. Radiation is believed to effect crosslinking by generating polymer radicals which may combine and crosslink.

Dual cure systems, which use a combination of heat, moisture cure, and radiation steps, may be effectively employed. Dual cure systems are disclosed in U.S. Pat. No. 5,911,940 and No. 6,124,370, which are incorporated herein by reference in their entirety. For example, it may be desirable to employ peroxide crosslinking agents in conjunction with silane crosslinking agents; peroxide crosslinking agents in conjunction with radiation; or sulfur-containing crosslinking agents in conjunction with silane crosslinking agents.

The low molecular weight polymers disclosed herein may also be modified by various other cross-linking processes, including, but not limited to, the incorporation of a diene component, as a termonomer, in their preparations, and subsequent cross linking by the aforementioned methods, and further methods, including vulcanization via the vinyl group, using sulfur, for example, as the cross linking agent.

The functionalization may also occur at the terminal unsaturated group (e.g., vinyl group) or an internal unsaturation group, when such groups are present in the polymer. Such functionalization includes, but is not limited to, hydrogenation, halogenation (such as chlorination), ozonation, hydroxylation, sulfonation, carboxylation, epoxidation, and grafting reactions. Any functional groups, such as halogen, amine, amide, ester, carboxylic acid, ether, silane, siloxane, and so on, or functional unsaturated compounds, such as maleic anhydride, can be added across a terminal or internal unsaturation via known chemistry. Other functionalization methods include those disclosed in the following U.S. Pat. No. 5,849,828, entitled, "Metalation and Functionalization of Polymers and Copolymers;" U.S. Pat. No. 5,814,708, entitled, "Process for Oxidative Functionalization of Polymers Containing Alkylstyrene;" and U.S. Pat. No. 5,717,039, entitled, "Functionalization of Polymers Based on Koch Chemistry and Derivatives Thereof." Each of these patents is incorporated by reference, herein, in its entirety.

The polymers disclosed herein may be chlorinated with any of a variety of reagents, including elemental chlorine, and the chlorinated product then reacted with any of a variety of amines, e.g., ethylene diamine, to obtain aminated product, useful in fuel and motor oil compositions. See, for example, U.S. Pat. Nos. 3,960,515; 4,832,702; 4,234,235; and WO 92/14806 the disclosures of which are incorporated herein by reference in their entirety. Sulfonation can be conducted according to the methods disclosed in the following U.S. Pat. No. 5,753,774, entitled, "Functional Group Terminated Polymers Containing Sulfonate Group Via Sulfonation of Ethylenically Unsaturated Polymers;" U.S. Pat. No. 5,723,550, entitled, "Bulk Sulfonation of EPDM Rubber;" U.S. Pat. No. 5,596,128, entitled, "Sulfonating Agent and Sulfonation Process;" U.S. Pat. No. 5,030,399, entitled, "Method of In-Mold Sulfonation of Molded Plastic Article;" U.S. Pat. No. 4,532,302, entitled, "Process for the Sulfonation of an Elastomeric Polymer;" U.S. Pat. No. 4,308,215, entitled, "Sulfonation Process;" U.S. Pat. No. 4,184,988, entitled, "Process for the Sulfonation of an Elastomeric Polymer;" U.S. Pat. No. 4,157,432, entitled, "Bulk Sulfonation Process;" U.S. Pat. No. 4,148,821, entitled, "Process for Sulfonation," all of which are incorporated by reference herein in their entirety.

In accordance with some embodiments of this invention, the polymers with unsaturation are functionalized, e.g., with carboxylic acid producing moieties (preferably acid or anhydride moieties) selectively at sites of carbon-to-carbon unsaturation on the polymer chains, preferably in the presence of a free-radical initiator, to randomly attach carboxylic acid producing moieties, i.e., acid or anhydride or acid ester moieties, onto the polymer chains.

In one embodiment, this selective functionalization can be accomplished by halogenating, e.g., chlorinating or brominating the unsaturated alpha-olefin polymer with chlorine, or bromine at elevated temperatures. The halogenation normally helps increase the reactivity of starting alpha-olefin polymers with monounsaturated functionalizing reactant. The halogenated polymer is then reacted with sufficient monounsaturated reactant capable of adding functional moieties the polymer, e.g., monounsaturated carboxylic reactant, at elevated temperature, such that the product obtained will contain the desired number of moles of the monounsaturated carboxylic reactant per mole of the halogenated polymer. Processes of this general type are taught in U.S. Pat. Nos. 3,087,436; 3,172,892; 3,272,746, which are each incorporated herein by reference.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., C1 to C4 alkyl) acid esters of the foregoing, e.g., methyl maleate, ethyl fumarate, and methyl fumarate. Upon reaction with the polymer, the monounsaturation of the monounsaturated carboxylic reactant becomes saturated. Thus, for example, maleic anhydride becomes polymer substituted succinic anhydride, and acrylic acid becomes polymer substituted propionic acid.

In an another embodiment, the unsaturated ethylene interpolymers may be functionalized, selectively at the sites of olefinically unsaturated bonds in the polymer chains, with carboxylic acid, carboxylic ester or thiol ester functional groups via a Koch reaction. A Koch process comprises contacting a polymer composition, comprising at least one polymer having at least one carbon-carbon double bond, with a Koch catalyst. The catalyst is preferably a classical Bronsted acid or Lewis acid catalyst. The Koch reaction is conducted in a manner and under conditions sufficient to form a carbenium ion at the cite of said carbon-carbon double bond. The carbenium ion is reacted with carbon monoxide to form an acylium cation, which in turn, is reacted with at least one nucleophilic trapping agent, selected from the group consisting of water or at least one hydroxyl or one thiol group containing compound, to form functional groups, e.g. carbonyl functional groups, such as carbonyl or thiol carbonyl group-containing compounds as well as derivatives thereof. Processes for functionalizing unsaturated polymers via a Koch reaction are described more fully in U.S. Pat. No. 5,629,434, entitled "Functionalization of Polymers Based on Koch Chemistry and Derivatives Thereof," and the disclosure of which has been incorporated by reference herein in its entirety.

In other embodiments, the unsaturated ethylene interpolymers may be functionalized with carboxylic acid or ester moieties by reacting the starting polymers with carbon monoxide and an alcohol in the presence of a protonic acid, and catalyst system, comprising: (a) at least one of the metals palladium, rhodium, ruthenium, iridium and cobalt in elemental or compound form, and (b) a copper compound. Processes of this type are disclosed, for example, in published EP Application 148,592, the disclosure of which is incorporated herein by reference in its entirety.

In still other embodiments, functional groups may be added directly to the interpolymer by a Friedel-Crafts reaction or other electrophilic substitution reaction. Such functional groups include, for example, unsubstituted or substituted alkylcarbonyl, arylcarbonyl, and aralkyl groups; carboxylic acid or sulfonic acid groups or alkyl groups substituted with carboxylic acid or sulfonic acid groups; halogen, and $NO_2$, which can subsequently be transformed to $NH_2$. Preferably such groups include acyl such as substituted or unsubstituted phenylcarbonyl, carboxyalkylcarbonyl, and substituted or unsubstituted carboxybenzyl. Particularly preferred groups include —C(O)Me, which can be further functionalized to, for example, —$CO_2$H; —C(O)-p$C_6H_4$-Me (which can be further functionalized to, for example, —CH(OH)-p$C_6H_4$-Me); —CH(R5)$CH_2CH_2CO_2$H; —CH(R5)$CH_2CH_2SO_3$H; and —CH(R5)-p$C_6H_4$—$CO_2$H, wherein R5 is independently selected from hydrogen or an alkyl group; and —C(O)$CH_2CH_2CO_2$H. The functional groups containing acid groups can be converted to ionomeric salts, such as zinc ionomers by neutralization. The electrophilic substitution reactions which have been discovered to be advantageously useful for the substantially random polymers described above may be conducted as described in G. A. Olah, Friedel-Crafts and Related Reactions, Vol. II, Part 2, J. Wiley & Sons, N.Y., 1964.

Silane Functionalized Ethylene Interpolymers

In one embodiment, the invention provides ethylene interpolymers grafted with at least one silane compound. The grafted silane olefin interpolymer may or may not contain small amounts of hydrolysis product and/or other derivatives.

Suitable silanes include, but are not limited to, those of the general formula (I):

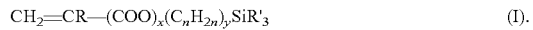

$$CH_2\!=\!CR\!-\!(COO)_x(C_nH_{2n})_y SiR'_3 \qquad (I).$$

In this formula, R is a hydrogen atom or methyl group; x and y are 0 or 1, with the proviso that when x is 1, y is 1; n is an integer from 1 to 12 inclusive, preferably 1 to 4, and each R' independently is an organic group, including, but not limited to, an alkoxy group having from 1 to 12 carbon atoms (e.g. methoxy, ethoxy, butoxy), an aryloxy group (e.g. phenoxy), an araloxy group (e.g. benzyloxy), an aliphatic or aromatic siloxy group, an aromatic acyloxyl group, an aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms.

In one embodiment, the silane compound is selected from vinyltrialkoxysilanes, vinyltriacyloxysilanes or vinyltrichlorosilane. In addition, any silane, or mixtures of silanes, which will effectively graft to, and/or crosslink, the ethylene interpolymers can be used in the practice of this invention. Suitable silanes include unsaturated silanes that comprise both an ethylenically unsaturated hydrocarbyl group, such as a vinyl, allyl, isopropenyl, butenyl, cyclohexenyl or γ-(meth)acryloxy allyl group, and a hydrolyzable group, such as, a hydrocarbyloxy, hydrocarbonyloxy, or hydrocarbylamino group, or a halide. Examples of hydrolyzable groups include methoxy, ethoxy, formyloxy, acetoxy, proprionyloxy, chloro, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al., which is incorporated herein, in its entirety, by reference. Preferred silanes include vinyltrimethoxysilane, vinyltriethoxysilane, 3-(trimethoxysilyl)propyl methacrylate (γ-(meth)acryloxypropyl trimethoxysilane), and mixtures thereof.

The silane can be grafted to the polymer by any conventional method, typically in the presence of a free radical initiator, for example peroxides and azo compounds, etc., or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy) hexane, lauryl peroxide, and tert-butyl peracetate. A suitable azo compound is 2,2'-azobis(isobutyronitrile).

The amount of initiator and silane employed will affect the final structure of the silane grafted polymer, such as, for example, the degree of grafting in the grafted polymer and the degree of crosslinking in the cured polymer. The resulting structure, will in turn, affect the physical and mechanical properties of the final product. Typically, the amount of initiator and silane employed will not exceed that which is determined to provide the desired level of crosslinking and the resulting properties in the polymer.

The grafting reaction should be preformed under conditions that maximize grafts onto the polymer backbone, and minimize side reactions, such as the homopolymerization of grafting agent, which is not grafted to the polymer. Some silane agents undergo minimal or no homopolymerization, due to steric features in the molecular structure, low reactivity and/or other reasons.

Cure (crosslinking) of a silanated graft is promoted with a crosslinking catalyst, and any catalyst that will effectively promote the crosslinking of the particular grafted silane can be used. These catalysts generally include acids and bases, and organometallic compounds, including organic titanates, organic zirconates, and complexes or carboxylates of lead, cobalt, iron, nickel, zinc and tin.

Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, can be used. The amount of catalyst will depend on the particular system at issue.

In certain embodiments of the claimed invention, dual crosslinking systems, which use a combination of radiation, heat, moisture and crosslinking steps, may be effectively employed. For instance, it may be desirable to employ peroxide crosslinking agents in conjunction with silane crosslinking agents, peroxide crosslinking agents in conjunction with radiation, or sulfur-containing crosslinking agents in conjunction with silane crosslinking agents. Dual crosslinking systems are disclosed, and claimed in, U.S. Pat.

Nos. 5,911,940 and 6,124,370, the entire contents of both are herein incorporated by reference.

Maleic Anhydride Functionalized Olefin Interpolymers

In another embodiment, the invention provides ethylene interpolymers grafted with maleic anhydride. The grafted maleic anhydride olefin interpolymer may or may not contain small amounts of hydrolysis product and/or other derivatives.

The maleic anhydride, as well as many other unsaturated heteroatom containing species, may be grafted to the polymer by any conventional method, typically in the presence of a free radical initiator, for example the peroxide and azo classes of compounds, etc., or by ionizing radiation. Organic initiators are preferred, such as any one of the peroxide initiators, such as, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, 2,5-dimethyl-2,5-di(tert-butyl peroxy)-3-hexyne, lauryl peroxide, and tert-butyl peracetate. A suitable azo compound is 2,2'-azobis(isobutyronitrile). The organic initiators have varying reactivities at different temperatures, and may generate different types of free radicals for grafting. One skilled in the art may select the appropriate organic initiator as needed for the grafting conditions.

The amount and type of initiator, the amount of maleic anhydride, as well as reaction conditions, including temperature, time, shear, environment, additives, diluents, and the like, employed in the grafting process, may impact the final structure of the maleated polymer. For example, the degree of maleic anhydride/succinic anhydride, their oligomers, and their derivatives, including hydrolysis products, grafted onto the grafted polymer may be influenced by the aforementioned considerations. Additionally, the degree and type of branching, and the amount of crosslinking, may also be influenced by the reaction conditions and concentrations. In general, it is preferred that crosslinking during the maleation process be minimized. The composition of the base olefin interpolymer may also play a role in the final structure of the maleated polymer. The resulting structure, will in turn, affect the properties and use of the final product. Typically, the amount of initiator and maleic anhydride employed will not exceed that, which is determined to provide the desired level of maleation and desired melt flow, each required for the functionalized polymer and its subsequent use.

The grafting reaction should be performed under conditions that maximize grafts onto the polymer backbone, and minimize side reactions, such as the homopolymerization of the grafting agent, which is not grafted to the olefin interpolymer. It is not unusual that some fraction of the maleic anhydride (and/or its derivatives) does not graft onto the olefin interpolymer, and it is generally desired that the unreacted grafting agent be minimized. The grafting reaction may be performed in the melt, in solution, in the solid-state, in a swollen-state, and the like. The maleation may be performed in a wide-variety of equipments, such as, but not limited to, twin screw extruders, single screw extruders, Brabenders, batch reactors, and the like.

Additional embodiments of the invention provide for olefin interpolymers grafted with other carbonyl-containing compounds. Such compounds include, but are not limited to, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

Definitions

Any numerical range recited herein, includes all values from the lower value to the upper value, in increments of one unit, provided that there is a separation of at least two units between any lower value and any higher value. As an example, if it is stated that a compositional, physical or mechanical property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to melt viscosity, number average molecular weight, weight average molecular weight, molecular weight distribution, various temperatures ($T_m$, $T_c$), percent crystallinity, percent comonomer, Rv value, number of carbon atoms in a comonomer, density and other properties.

The term "composition," as used herein, includes a mixture of materials which comprise the composition, as well as reaction products and decomposition products formed from the materials of the composition.

The terms "blend" or "polymer blend," as used herein, mean a blend or mixture of two or more polymers. Such a blend may or may not be miscible (not phase separated at molecular level). Such a blend may or may not be phase separated.

Such a blend may or may not contain one or more domain configurations, as determined from transmission electron spectroscopy, light scattering, x-ray scattering, and other methods known in the art.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The terms, "ethylene interpolymer," "ethylene/α-olefin interpolymer," and related terms, as used herein, refer to an ethylene-based interpolymer that contains 50 mol % or more polymerized ethylene monomers.

The terms "low molecular weight ethylene interpolymer" and "high molecular weight ethylene interpolymer," as used herein, refer to two distinct interpolymers, and where the weight average molecular weight of the "high molecular weight ethylene interpolymer" is at least 2×, preferably at least 5×, and more preferably at least 10× the weight average molecular weight of the "low molecular weight ethylene interpolymer." Weight average molecular weight can be determined using conventional techniques known in the art, such as Gel Permeation Chromatography (GPC). The "low molecular weight ethylene interpolymer" and "high molecular weight ethylene interpolymer," can be distinguished by GPC.

The terms "functionalized ethylene interpolymer," and related terms, as used herein, refer to the reaction product of a base polymer with one or more compounds. The reaction may be initiated by a free radical initiator, anionic initiator, cationic initiator, radiation, thermal means, and other reaction initiating means. Reaction products include, but are not limited to, grafted polymers produced by free radical, anionic and cationic mechanisms, and products resulting from nitrene insertion reactions.

The term "silane-grafted," as used herein, refers to the chemical linkage of moieties containing silane, derived from one or more silane agents, on the backbone of a polymeric structure. Such moieties may be linked within the polymeric structure (as pendant groups), or linked at a terminal of the polymer structure, and one or more silane moieties may be linked together at a particular position along the backbone. In addition, this term also includes minor amounts of silane moieties that connect two or more polymeric chains by a crosslinking reaction, prior to any significant degree of crosslinking of the grafted polymer.

Test Methods

NMR General Procedure for Polymer Reprecipitation Prior to NMR Analysis

To minimize interference from additives, catalyst residues, and other impurities, which may be present in the samples of the experimental section described below, the polymers were re-precipitated prior to $^1$H NMR analysis. Under an inert atmosphere, 0.5 to 1 g of polymer was dissolved in hot ISOPAR E. The polymer was re-precipitated by pouring the hot solution into 600 ml of methanol while stirring. The polymer was collected by filtration, washed with aliquots of methanol, and then extracted for two hours in dichloromethane. The extracted polymer was collected by filtration and dried in a vacuum oven at 40° C. overnight.

General Procedure for $^1$H NMR Method Used to Quantify and Identify Unsaturation in Ethylene-Octene Copolymers The sensitivity of $^1$H NMR spectroscopy was enhanced by utilizing the technique of peak suppression to eliminate large proton signals from the polyethylene backbone. This allowed for a detection limit, in the parts per million range, in approximately one hour data acquisition time. This is in part achieved by a 100,000-fold reduction of the signal from the —CH$_2$— protons, which, in turn, allowed for the data to be collected using a higher signal gain value. As a result, the unsaturated end groups can be rapidly and accurately quantified.

The high level of terminal vinyl unsaturations produced with this catalyst was quantified as the ratio of the vinyl groups to the sum of all terminal unsaturations, Rv, as defined below $$R_v = \frac{[vinyl]}{[vinyl] + [vinylidene] + [cis] + [trans]},$$

wherein [vinyl] is the concentration of vinyl groups in the isolated polymer in vinyl/1000 carbon atoms; [vinylidene], [cis], and [trans] are the concentration of vinylidene, cis and trans vinylene groups in the isolated polymer in amount per 1000 carbon atoms, respectively.

The samples were prepared by adding approximately 0.100 g of polymer in 2.5 ml of solvent in a 10 mm NMR tube. The solvent used was a 50/50 mixture of 1,1,2,2-tetrachloroethane-d2 and perchlorethylene. The samples were dissolved and homogenized by heating and vortexing the tube and its contents at 130° C. The NMR data were collected using a Varian Unity Plus 400 MHz NMR spectrometer. The acquisition parameters used for the Presat experiment include a pulse width of 30 μs, 200 transients per data file, a 1.6 second acquisition time, a spectral width of 10,000 Hz, a file size of 32K data points, a temperature setpoint of 110° C., D1 delay time of 4.40 second, a Satdly of 4.0 second, and a Satpwr of 16.

$^{13}$C NMR for Comonomer Content of Solvent/Non-Solvent Samples

The samples were prepared by adding approximately 3 g of a 50/50 mixture of tetrachloroethane-d2/orthodichlorobenzene that contained 0.025 M in chromium acetylacetonate (relaxation agent), to a 0.4 g sample in a 10 mm NMR tube. The samples were dissolved and homogenized by heating the tube and its contents to 150° C. The data were collected using a Varian Unity Plus 400 MHz NMR spectrometer, corresponding to a $^{13}$C resonance frequency of 100.6 MHz. Acquisition parameters were selected to ensure quantitative $^{13}$C data acquisition in the presence of the relaxation agent. The data were acquired using gated $^1$H decoupling, 4000 transients per data file, a 6 second pulse repetition delay, a spectral width of 24,200 Hz and a file size of 64K data points, with the probe head heated to 130° C.

Gel Permeation Chromatography

The chromatographic system consisted of either a Polymer Laboratories Model PL-210 or a Polymer Laboratories Model PL-220. The column and carousel compartments were operated at 140° C. Three Polymer Laboratories 10-micron Mixed-B columns were used, with a solvent of 1,2,4 trichlorobenzene. The samples were prepared at a concentration of 0.1 g of polymer in 50 ml of solvent. The solvent used to prepare the samples contained 200 ppm of butylated hydroxytoluene (BHT). Samples were prepared by agitating lightly for 2 hours at 160° C. The injection volume was 100 microliters, and the flow rate was 1.0 ml/min. Calibration of the GPC column set was performed with narrow molecular weight distribution polystyrene standards purchased from Polymer Laboratories. The polystyrene standard peak molecular weights were converted to polyethylene molecular weights using:

$$M_{polyethylene} = A(M_{polystyrene})^B \quad (1),$$

where M is the molecular weight, A has a value of 0.4316, and B is equal to 1.0. Polyethylene equivalent molecular weight calculations were performed using Viscotek TriSEC software Version 3.0.

GPC Deconvolution Procedure

The GPC deconvolution algorithm fit the polymer samples with two most probable molecular weight distributions (plus an adjustable error term). In order to account for the variations in the underlying distributions, the basis functions were modified to incorporate a normal distribution term that allows the basis function for each component to be altered to varying degrees along the molecular weight axis. The advantage is that in the limit the basis unction will become a simple, most probable, Flory distribution.

Three components (j=1, 2, 3) are derived with the third component (j=3) being an adjustable error term. The molecular weight distribution of the GPC was normalized into weight fraction versus Log$_{10}$ molecular weight vectors. Therefore, each potential curve for deconvolution should consist of a height vector, h$_i$, where the heights are reported at known intervals of Log$_{10}$ molecular weight, the h$_i$ have been properly transformed from the elution volume domain to the Log$_{10}$ molecular weight domain, and the h$_i$ are normalized.

Each component, j, consists of a most probable, Flory, distribution, which has been convoluted with a normal or Gaussian spreading function using a parameter, $\sigma_j$. The resulting, three basis functions are used in a Chi-square, $X^2$, minimization routine to locate the parameters that best fit the n points in $h_i$, the GPC data vector as follows:

$$X^2(\mu_j, \sigma_j, w_j) =$$

$$\sum_{i=1}^{n}\left[\sum_{j=1}^{3} \cdot \sum_{k=1}^{20} w_j \cdot M_i^2 \cdot \lambda_{j,k}^2 \cdot CumND_{j,k} \cdot e^{-\lambda_{j,k}-M_i} \cdot \Delta Log_{10}M - h_i\right]^2$$

$$\lambda_{j,k} = 10^{\mu_j + \frac{k-10}{3} \cdot \sigma_j},$$

where, $CumND_{j,k}$, is the normal cumulative distribution function at the following point (x):

$$x = \mu_j + (k-10) \ast \sigma_j/3,$$

with variables being described in Table 1.

TABLE 1

Description of coefficients in equations describing GPC deconvolution

| Variable Name | Definition |
|---|---|
| $\lambda_{j,k}$ | Reciprocal of the number average molecular weight of most probable (Flory) distribution for component j, normal distribution slice k |
| $\sigma_j$ | Sigma (square root of variance) for normal (Gaussian) spreading function for component j |
| $w_j$ | Weight fraction of component j |
| K | Normalization term (1.0/$Log_e 10$) |
| $M_i$ | Molecular weight at elution volume slice i |
| $h_i$ | Height of $log_{10}$ (molecular weight) plot at slice i |
| n | Number of slices in Log molecular weight plot |
| i | Log molecular weight slice index (1 to n) |
| j | Component index (1 to 3) |
| k | Normal distribution slice index |
| $\Delta log_{10}M$ | Average difference between $log_{10}M_i$ and $log_{10}M_{i-1}$ in height vs. $log_{10}M$ plot |

The eight parameters which are derived from the Chi-square minimization are $\mu_1, \mu_2, \mu_3, \sigma_1, \sigma_2, \sigma_3, w_1$ and $w_2$. The term $w_3$ (error fraction) is subsequently derived from $w_1$ and $w_2$, since the sum of the three components must equal one. The Excel application, Solver, is used for the minimization procedure, with constraints added to insure proper minimization as shown in Table 2.

TABLE 2

Constraints used in minimization procedure of GPC deconvolution technique.

| Description | Constraint |
|---|---|
| Maximum of fraction 1 | $w_1 < 0.95$ (User adjustable) |
| Lower limit of spreading function | $\sigma_1, \sigma_2, \sigma_3 > 0.001$ (must be positive) |
| Upper limit of spreading function | $\sigma_1, \sigma_2, \sigma_3 < 0.2$ (User adjustable) |
| Normalized fractions | $w_1 + w_2 + w_3 = 1.0$ |

Additional constraints which are to be understood include the limitation that only $\mu_j > 0$ are allowed. Also, the $w_j$ are all understood to be positive. This constraint can be handled outside of solver. If the $w_j$ are understood to arise from the selection of two points along the interval $0.0 < P_1 < P_2 < 1.0$; whereby $w_1 = P_1$, $w_2 = P_2 - P_1$ and $w_3 = 1.0 - P_2$; then constraining $P_1$ and $P_2$ are equivalent to the constraints required above for the $w_j$. To obtain an optimum curvature matrix for the fit, the following options were set in Solver as shown in Table 3.

TABLE 3

Solver options used for GPC deconvolution.

| Label | Value or selection |
|---|---|
| Max Time (seconds) | 1000 |
| Iterations | 100 |
| Precision | 0.000001 |
| Tolerance (%) | 5 |
| Convergence | 0.001 |
| Estimates | Tangent |
| Derivatives | Forward |
| Search | Newton |
| ALL OTHER SELECTIONS | Not selected |

A first estimate for the values of $\mu_1, \mu_2, w_1$, and $w_2$ can be obtained by assuming two ideal Flory components that give the observed weight average, number average, and z-average molecular weights for the observed GPC distribution. Then $\mu_1, \mu_2, w_1$, and $w_2$ are solved for allowing a small error term, $w_3$, and meeting the constraints given previously before entering into Solver for the minimization step. Starting values for $\sigma_j$ are all set to 0.05.

Brookfield Viscosity

The Brookfield viscosities were measured according to ASTM D 3236-04, on a Brookfield LVDVII+ with Thermosel and disposable aluminum sample chambers. The spindle was generally a SC-31 hot-melt spindle, suitable for measuring viscosities in the range of from 30 to 100,000 centipoise. A cutting blade was employed to cut samples into pieces small enough to fit into the 1 inch wide, 5 inches long sample chamber. The sample was placed in the chamber, which was in turn inserted into a Brookfield Thermosel, and locked into place with bent needle-nose pliers. The sample chamber had a notch on the bottom that fits the bottom of the Brookfield Thermosel to ensure that the chamber was not allowed to turn when the spindle was inserted and spinning. The sample was heated to the desired temperature, with additional sample being added until the melted sample was about 1 inch below the top of the sample chamber. The viscometer apparatus was lowered and the spindle submerged into the sample chamber. Lowering was continued until brackets on the viscometer align on the Thermosel. The viscometer was turned on, and set to a shear rate which led to a torque reading in the range of 30 to 60 percent. Readings were taken every minute for about 15 minutes, or until the values stabilized, at which time the final reading was recorded.

Differential Scanning Calorimetry

The differential scanning calorimetry (DSC) data were gathered on a TA Q1000 calorimeter. A piece of sample, 5-8 mg, was cut out of a larger piece of sample with a razor blade, and placed directly in the pan for analysis. This is in contrast to higher molecular weight samples, where a thin film is usually pressed. This was not done as these samples were either sticky or tended to flow too readily during pressing (although plaques can be made, as they are used in density testing). The sample was heated to 180° C., and kept isothermal for 3 minutes to ensure complete melting (first heat). The sample was then cooled at 10° C./min to −60° C., and kept isothermal for 3 minutes. The sample was then heated to 150° C. (second heat) at 10° C./min. The second heating curve and the cooling curve are reported in this work.

Percent crystallinity is determined by differential scanning calorimetry using a Perkin-Elmer DSC 7. The percent crystallinity may be calculated with the equation:

$$\% \text{ Cryst.} = (A/292 \text{J/g}) \times 100,$$

wherein "% Cryst." represents the percent crystallinity and A represents the heat of fusion of the ethylene-based polymer in Joules per gram (J/g), as determined from the DSC profile.

Rheology

Both dynamic and capillary rheology were run on selected samples. The dynamic experiments were conducted on a Rheometrics RMS-800, at 125° C., on 50 mm parallel plates over a frequency range of 0.1-100 rad/s, with 5 points per decade in a nitrogen purge. The capillary experiments were conducted at 125° C., on a Gottfert Rheograph 2003. A 200 bar pressure transducer, with a 0.5 mm diameter, 30 length to diameter capillary with a flat entry angle was used at shear rates >100 s$^{-1}$.

Solvent/Non-Solvent Fractionation

The distinct molecular weight fractions of four samples were separated by solvent/non-solvent fractionation in a commercial Preparative CRYSTAF unit manufactured by PolymerChar (Valencia, Spain). The fractionation was carried out by the successive addition of mixtures of diethyleneglycolmonobutylether (DEGMBE) (non-solvent) and o-xylene (solvent) at isothermal conditions. The xylene contained 1 wt % BHT as an additive and the DEGMBE contained no additive. For a particular solvent composition and temperature, the polymer is in a sol-gel state, and the molecular weight of the polymer remaining in the soluble phase is determined by the polymer's solubility at the given solvent/non-solvent composition.

In the preparative CRYSTAF approach, the soluble polymer is then filtered and collected by transferring the solution through a heated transfer line by nitrogen pressure into a collection vial. Successive molecular weight fractions are then collected by increasing the solvent quality (lower amounts of non-solvent) causing higher molecular weight polymer to be solubilized. For these fractionation experiments, two fractions were collected: one at 85% vol/vol DEGMBE/o-xylene and the other with 100% xylene. The total volume for each fraction was 200 mL.

In general, the procedure was carried out by dissolving 1 gram of the whole polymer in a solvent-rich condition at 130° C. (100% o-xylene containing 3.88 g/4 L of butylated hydroxy toluene (BHT)). After a 2 hr dissolution period, followed by 15 minutes of stabilization at 120° C., the solution was then cooled to 30° C. to precipitate and crystallize the polymer from the solution. This additional precipitation at 30° C. step was only performed for the first time to ensure that no material remained solubilized from the first non-solvent/solvent composition. The first molecular weight fraction (lowest) was then precipitated by adding in the required amount of DEGMBE (in this case, 85% of the volume), followed by stabilization for 15 minutes, and then heating the solution to 124° C. Once at 124° C., the solution was then cooled to 120° C. to stabilize the sol-gel composition. The soluble portion of the material was then transferred through a heated line and collected in glass vessels. The precipitated material (higher molecular weight fraction) was retained in the vessel. This remaining fraction was then dissolved with 100% xylene with similar steps as listed above. This last fraction collected was completely soluble in the o-xylene solvent, and is the highest molecular weight fraction collected.

FTIR (Incorporated Silane Level)

The percent of grafted vinyltriethoxy silane (VTES) present in functionalized polymers was determined based on the FTIR absorbances at 1105 cm$^{-1}$ (Si—O) and 2023 cm$^{-1}$ (internal thickness). The ratio of the 1105/2023 peak heights was plotted against the known concentration of silane as determined by neutron activation. A sample film was prepared of 7-10 mils thickness, in a hydraulic press by heating on low (contact) pressure, at 75° C., for 2 minutes, and high pressure (20,000 psi) for 1 minute. The sample was removed and allowed to cool to room temperature. The film was then placed in a film holder and put in a vacuum oven at 50° C. for 1 hour. After the oven aging, the sample was held at room temperature for 24 hour, after which time, the spectrum was collected. The spectra were collected at one hour in the oven (this initial oven aging generally removes 95% of the ungrafted silane), and after 24 hours held at room temperature. The ratio of the 1105 cm$^{-1}$ peak height to the 2019 cm$^{-1}$ peak height was then used to calculated the % VTES:

$$\% \text{ VTES} = 0.1156 * \left( \frac{PeakHeight1105 \text{ cm}^{-1}}{PeakHeight2023 \text{ cm}^{-1}} \right) + 0.0345. \quad (2)$$

This correlation was based on the use of FTIR and neutron activation data to determine the % vinyl triethoxysilane.

Density is measured in accordance with ASTM D-792-00. The molded samples were conditioned at 23° C. (±2° C.) and 50 percent relative humidity (±5%) for one hour before the measurements were taken.

EXPERIMENTAL

General: All organometallic reactions and polymerizations were performed under a purified argon or nitrogen atmosphere in a vacuum atmosphere glove box, and in glassware previously dried in a vacuum oven at 150° C., overnight. All solvents were anhydrous and de-oxygenated and purified according to known techniques. All ligands and metal precursors were prepared according to procedures known to those of skill in the art (e.g., under inert atmosphere conditions, etc.).

I. Semi-Batch Reactor Ethylene/1-Octene Copolymerization Procedure (Gallon Solution)

A. Materials and Reactions

Unless specified, all reagents were handled under anaerobic conditions. Solvents were obtained from Fisher Scientific as anhydrous solvents. They were sparged with dry nitrogen and contacted with a dry alumina column.

B. Catalyst System

The catalyst system contained a zirconium bisphenoxytriazole (bis[2,4-di-tert-butyl-6-(5-chloro-2H-benzo-triazol-2-yl)phenoxy]bis-(dimethylamino) zirconium), further denoted as CAT 51, triisobutylaluminium (TiBAl) and Armeenium borate.

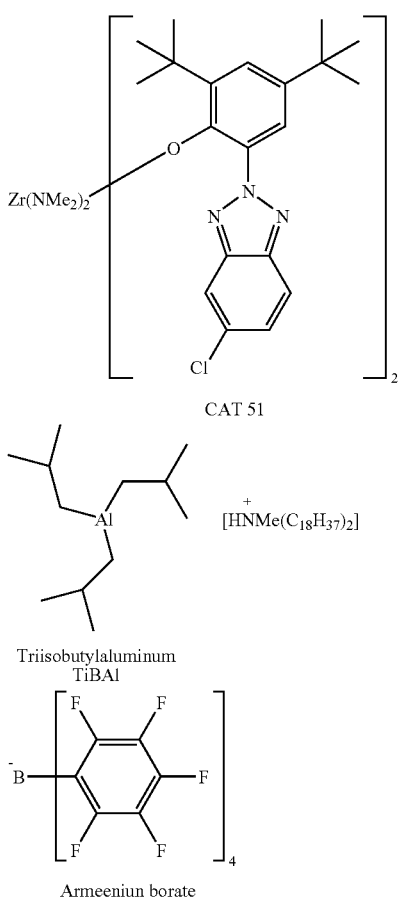

CAT 51

Triisobutylaluminum
TiBAl

Armeeniun borate

C. Preparation of Bis[2,4-di-tert-butyl-6-(5-chloro-2H-benzo-triazol-2-yl)phenoxy]bis-(dimethylamino) zirconium (CAT 51)

In a dry box, 2,4-di-tert-butyl-6-(5-chloro-2H-benzo-triazol-2-yl)phenol (25 g, 70.11 mmol) was transferred to a 1 L round bottom flask and dissolved in pentane (150 ml) to from a solution. Tetrakis(dimethylamino)zirconium (9.38 g, 35.05 mmol) in pentane (150 ml) was added to this solution. The mixture was stirred for one hour and then the volatiles were removed under vacuum to obtain yellow solid. The yellow solid was used without further purification (yield, 91%).

D. Semi-Batch Reactor Ethylene/1-Octene Polymerization (Gallon Reactor)

Representative Procedure

A one gallon stirred reactor was charged with 1440 g of ISOPAR-E and 127 g of 1-octene. The mixture was heated to 130° C., and saturated with ethylene, at about 450 psig total reactor pressure. A catalyst solution was prepared in a dry box by combining solutions of catalyst precursor, Armeenium borate, and triisobutylaluminum, to give 3 µmoles of Zr, 3.6 µmoles of Armeenium borate, and 150 µmoles of Al. The catalyst solution was then transferred by syringe to a catalyst addition loop, and injected into the reactor using a flow of high pressure solvent. The polymerization was allowed to proceed for 10 minutes, while feeding ethylene on demand to maintain a pressure of 450 psig. The amount of ethylene consumed during the polymerization was monitored using a mass flow meter. The polymer solution was dumped into a nitrogen purged glass kettle containing isopropanol. The additive solution was added, and the polymer solution was stirred to promote good mixing. The contents were poured into a glass pan, cooled, allowed to stand in a hood overnight, and then dried in a vacuum oven for two days.

E. Batch Reactor Results

Catalysis, GPC, and NMR Endgroup Analysis

The batch reactor polymerization results are summarized in Table 4. Gel Permeation Chromatography results are summarized in Table 5, and viscosity and DSC results are summarized in Table 6. The bisamido zirconium catalyst was first contacted with triisobutyl aluminum (TIBAl) in various ratios and contact times, in order to determine the most effective conditions for alkylation of the catalyst, prior to activation with the Armeenium borate activator. Sample B1 had a density of 0.9435 g/cc, Sample B2 had a density of 0.9432 g/cc, Sample B6 had a density of 0.9444 g/cc, and Sample B8 had a density of 0.9464 g/cc.

TABLE 4

| | Batch Reactor Polymerization Results for Ethylene/1-Octene Prepared with CAT 51* | | | | | | |
|---|---|---|---|---|---|---|---|
| Sample | TIBAL Ratio (Al/Zn) | Hydrogen (mmol) | Vinyl/ 1000C | Cis/Trans Vinylene/1000C | Trisub. Unsat/1000C* | Vinylidene/ 1000C | Rv |
| B1 | 20 | 5 | 41.15 | 1.27 | 2.55 | 0.00 | 0.97 |
| B2 | 20 | 25 | 44.80 | 1.40 | 2.33 | 0.47 | 0.96 |
| B3 | 20 | 0 | 39.12 | 1.24 | 2.06 | 0.82 | 0.95 |
| B4 | 10 | 0 | 49.78 | 1.04 | 3.11 | 0.52 | 0.96 |
| B5 | 5 | 0 | 48.50 | 1.00 | 2.00 | 0.00 | 0.97 |
| B6 | 50 | 0 | 42.90 | 1.81 | 3.61 | 0.45 | 0.95 |
| B7 | 100 | 0 | 41.15 | 1.27 | 0.85 | 0.00 | 0.97 |
| B8 | 250 | 0 | 33.95 | 0.70 | 1.05 | 0.00 | 0.97 |
| B9 | 500 | 0 | NM | NM | NM | NM | NM |
| B10 | 1,000 | 0 | 27.44 | 0.56 | 1.96 | 0.00 | 0.98 |

*Reaction conditions: 130° C., 450 psi, 130 g octene, 3 µmol catalyst, and ten minute reaction time

TABLE 5

Molecular Weight Data from GPC and GPC Deconvolutions for CAT 51 Batch Reactor Resins

| | GPC Data | | | Deconvolutions | | | | | | | | | |
|---|---|---|---|---|---|---|---|---|---|---|---|---|---|
| Sample | Overall $M_w$ (g/mol) | Overall $M_n$ (g/mol) | Overall $M_w/M_n$ | Overall $M_w$ (g/mol) | Overall $M_n$ (g/mol) | Overall $M_w/M_n$ | Low MW $M_w$ (g/mol) | Low MW $M_n$ (g/mol) | Low MW $M_w/M_n$ | High MW $M_w$ (g/mol) | High MW $M_n$ (g/mol) | High MW $M_w/M_n$ | % High MW |
| B1 | 7,060 | 330 | 21.34 | 7,307 | 349 | 20.91 | 818 | 324 | 2.53 | 382,850 | 179,196 | 2.14 | 1.51 |
| B2* | 2,310 | 300 | 7.70 | 2,396 | 320 | 7.49 | 675 | 252 | 2.68 | 0 | 0 | — | 0.00 |
| B3 | 8,780 | 340 | 25.82 | 9,085 | 358 | 25.38 | 693 | 284 | 2.44 | 431,166 | 212,601 | 2.03 | 0.41 |
| B4 | 13,600 | 270 | 46.90 | 14,063 | 304 | 46.31 | 562 | 213 | 2.64 | 132,354 | 63,843 | 2.07 | 5.43 |
| B5 | 7,570 | 280 | 27.04 | 7,833 | 295 | 26.54 | 599 | 238 | 2.51 | 329,445 | 164,113 | 2.01 | 0.80 |
| B6 | 8,940 | 310 | 28.84 | 9,244 | 329 | 28.13 | 815 | 327 | 2.49 | 491,762 | 120,058 | 4.10 | 2.61 |
| B7 | 9,260 | 330 | 28.06 | 9,582 | 345 | 27.78 | 689 | 287 | 2.40 | 338,021 | 168,356 | 2.01 | 1.54 |
| B8 | 10,200 | 400 | 25.50 | 10,606 | 418 | 25.36 | 274 | 340 | 2.18 | 279,275 | 124,528 | 2.24 | 2.99 |
| B9 | 18,700 | 480 | 38.96 | 19,419 | 505 | 38.49 | 801 | 395 | 2.02 | 242,426 | 32,265 | 7.51 | 10.81 |
| B10 | 32,100 | 500 | 64.20 | 33,205 | 521 | 63.77 | 866 | 424 | 2.04 | 295,651 | 39,341 | 7.52 | 17.02 |

*Difficult to deconvolute sample; results approximate

Figure 2:
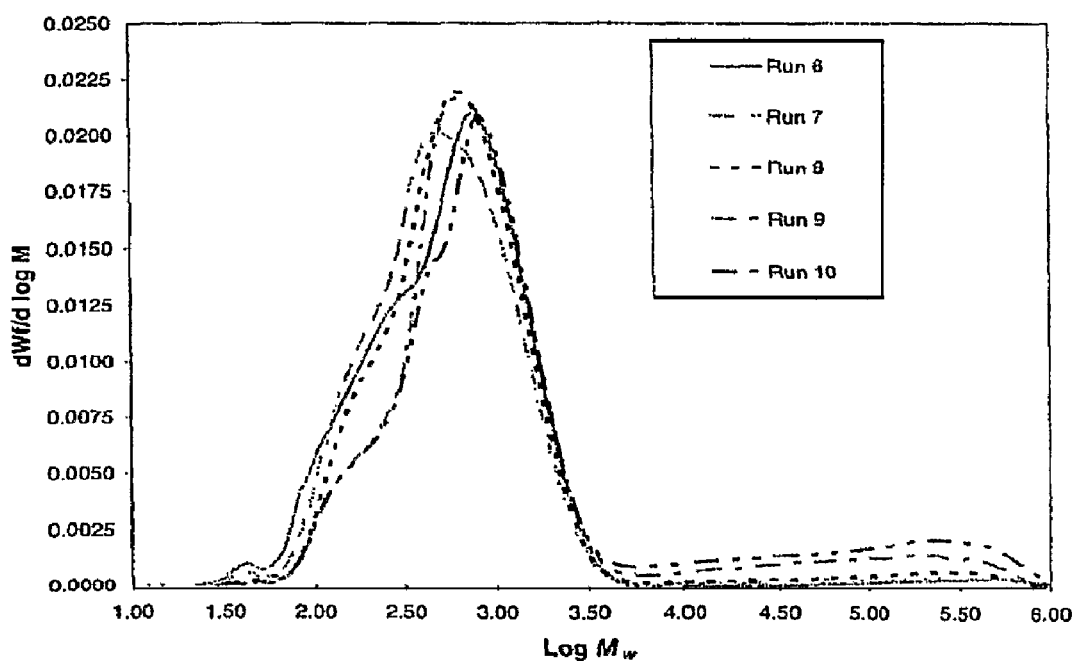
FIG. 2 depicts Gel Permeation Chromatography (GPC) profiles for batch polymerization runs 6-10 (samples B6-B10).

GPC profile distributions of the batch reactor resins prepared with CAT 51 are shown in FIGS. 1 and 2. GPC analyses of the polymers showed that the majority of the polymers had very low molecular weights, as shown in Table 5, with a small amount of high molecular weight fraction. Deconvolutions of the GPC traces, revealed that although the overall molecular weight distribution was very broad (Mw/Mn ~8-64), the individual low and high molecular weight fractions had Mw/Mn from ~2 to 8. The high molecular weight fraction of the polymer varied from 0.4% to 17.0% (weight %), the Mw ranged from 130,000 to 490,000 g/mol, and the Mn ranged from 30,000 to 215,000 g/mol. The primary low molecular weight portion of the polymer had a Mw from 250 to 900 g/mol, a Mn from 200 to 450 g/mol, and a Mw/Mn from 2 to 3.

In addition, the catalytic polymerization produced polymers with very high vinyl termination. Over 97% of all polymer chains had a vinyl end group at a terminal end of the polymer, when polymerization was conducted under batch reactor conditions. The consistency of the chain end distribution is shown in Table 1. The distribution of unsaturated chain ends was not affected by the TIBAL ratio or catalyst efficiency. This high vinyl termination provides a means for post reactor polymer functionalization by various methods, such as, the grafting of silane or maleic anhydride, or grafting of other functional groups, such as, styrene, perfluoro alkyl ethane (fluorine functional group), acrylic acid/acrylates, and the like.

F. Viscosity and DSC Analyses

Brookfield viscosity and DSC profiles were determined on all samples, excluding Sample 9 as shown in Table 6. The viscosities of the samples were generally low, in the range from 15 cP to 1,320 cP (at 149° C.), excluding the highest viscosity samples, Sample 4 and Sample 10, which had viscosities of 14,007 cP and >100,000 cP, respectively, at 149° C. Both of these higher viscosity samples contained high amounts of high molecular weight materials (>5%). Samples 1-3 and 5-9, are suitable for wax compositions based upon their viscosity and their high crystallinity (72-79%). The viscosity range of Sample 4 is similar to the viscosity of polymer components of a hot melt adhesive.

Figure 3:
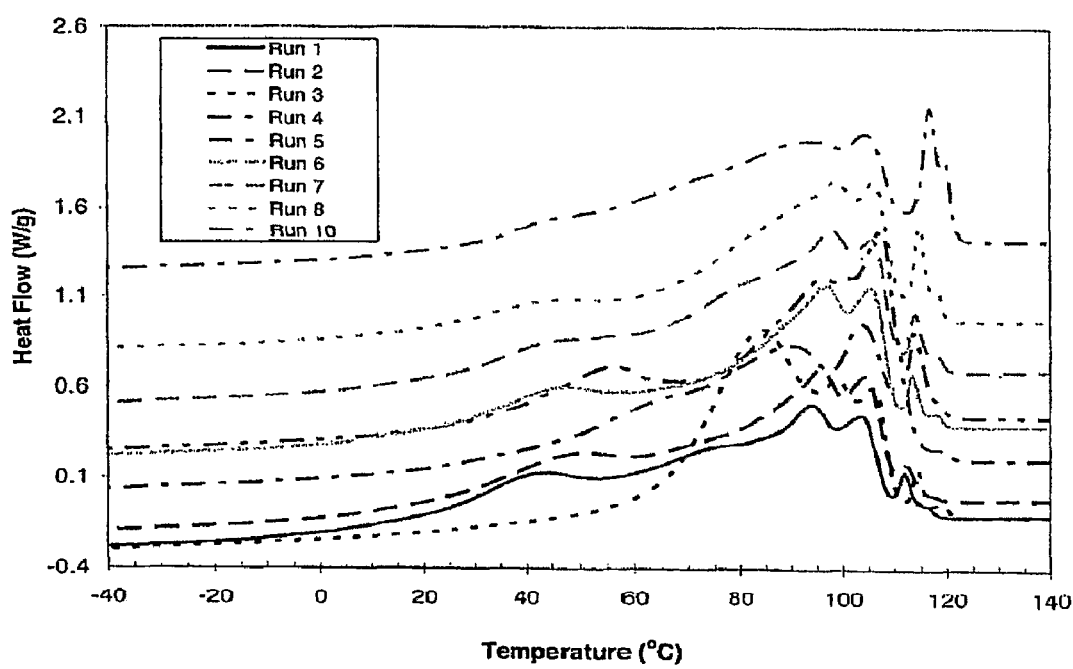
FIG. 3 depicts Differential Scanning Calorimetry (DSC) profiles (heating) for the batch polymerization runs 1-8 and 10 (samples B1-B8 and B10).

The DSC heating profiles are shown in FIG. 3. As can be seen by the summary of the DSC data in Table 6, and the profiles of FIG. 3, these materials exhibited multiple melting points, and the high crystallinity of the samples (72-79%) indicates that little of the octene was effectively incorporated to reduce crystallinity levels.

TABLE 6

Summary of Brookfield Viscosity and DSC Data for CAT 51 Batch Reactor Resins

| Sample | Viscosity (cP) @ 125° C. | Viscosity (cP) @ 149° C. | Viscosity (cP) @ 177° C. | $T_{m1}$ (° C.) | $T_{m2}$ (° C.) | $T_{m3}$ (° C.) | $T_{m4}$ (° C.) | $T_{m5}$ (° C.) | Heat of Fusion (J/g) | % Cryst. | $T_{c1}$ (° C.) | $T_{c2}$ (° C.) |
|---|---|---|---|---|---|---|---|---|---|---|---|---|
| B1 | 216 | 124 | 73 | 44.8 | 93.9 | 103.6 | 111.8 | | 210.7 | 72.2 | 95.8 | 42.3 |
| B2 | 23 | 15 | 10 | 52.0 | 95.8 | 104.5 | 112.0 | | 217.7 | 74.6 | 97.3 | 47.8 |
| B3 | 732 | 403 | 214 | 84.5 | 98.9 | 106.0 | 114.2 | 119.0 | 230.5 | 78.9 | 97.9 | 79.5 |
| B4 | 25,844 | 14,007 | 7,150 | 90.6 | 103.9 | 111.3 | 118.9 | | 217.2 | 74.4 | 98.9 | 62.5 |
| B5 | 614 | 344 | 187 | 56.9 | 96.5 | 107.3 | 113.7 | | 227.9 | 78.0 | 54.8 | 100.2 |
| B6 | 577 | 345 | 195 | 48.3 | 96.7 | 105.5 | 113.3 | 118.0 | 215.4 | 73.8 | 98.0 | 45.0 |
| B7 | 356 | 201 | 114 | 97.7 | 105.6 | 113.9 | 118.0 | | 222.2 | 76.1 | 97.1 | |
| B8 | 2,434 | 1,320 | 694 | 48.8 | 99.0 | 106.0 | 114.7 | 118.0 | 214.1 | 73.3 | 103.9 | 98.3 |
| B10 | | Did not melt | | 94.0 | 104.5 | 116.8 | 119.8 | | 211.6 | 72.5 | 106.1 | 97.3 |

*B9 sample not available.

G. Rheology

Selected Samples

The shear thinning, or change in viscosity as a function of shear rate, of selected resins, Samples B4 and B5, was investigated, and compared to samples which were unimodal. Sample B4 contained a high amount (5%) of high molecular weight fraction, and Sample B5 contained a low amount of high molecular weight fraction (0.8%). Additionally, two comparative samples were chosen, with each one having a relatively narrow molecular weight distribution (Mw/Mn=2.2-2.9) and a Brookfield viscosity, at 149° C., similar to that of either Sample B4 or Sample B5 (CAT 51 samples). A summary of the results is shown in Table 7.

Figure 4:
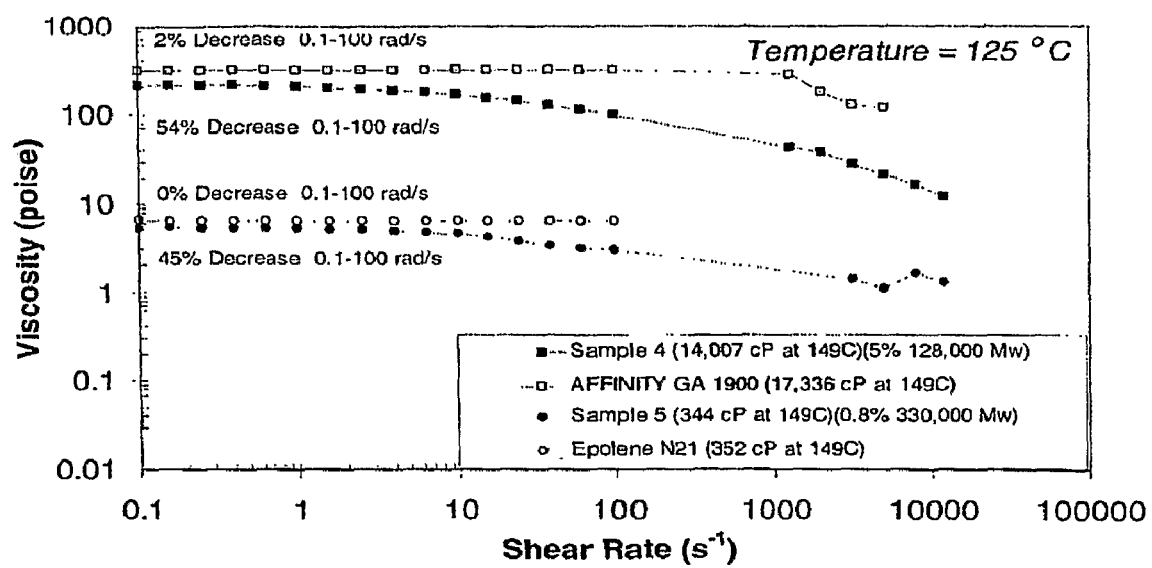
FIG. 4 depicts viscosity profiles for batch polymerization samples, B4 and B5, and two comparative resins.

FIG. 4 shows viscosity as a function of shear rate (T=125° C.) for two batch reactor vinyl terminated samples, produced using CAT 51, and the two comparative samples. The samples prepared using the CAT 51 catalyst system showed improved processability with increasing shear rate. The comparative samples showed essentially no shear thinning, or decrease in viscosity, with increasing shear rate over the range of 0.1-100 rad/s, whereas the two CAT 51 samples showed decreases of 45-54%. For Sample B5, although the low shear viscosity was approximately 340 cP, the high shear viscosity at 10,000 s$^{-1}$ was approximately 1 poise, or close to that of water, indicating excellent processability at high shear rates.

H. Solvent/Non-Solvent Fractionation

Selected Samples

The same two CAT 51 samples (Sample B4 and Sample B5) examined above, were also fractionated, and examined by GPC and NMR, to verify their composition, and in particular, whether both fractions of a given sample contained the same amount of comonomer and high vinyl unsaturation. The fractionation was performed as discussed above, in the test section. Results are shown in Table 8.

TABLE 7

Summary of CAT 51 Batch Reactor Samples and Comparative Samples Tested by Dynamic and Capillary Rheology.

| Sample | Viscosity (cP) @ 125° C. | Viscosity (cP) @ 149° C. | Viscosity (cP) @ 177° C. | Overall Mw (g/mol) | Overall Mn (g/mol) | Overall Mw/Mn |
|---|---|---|---|---|---|---|
| B4 | 25,844 | 14,007 | 7,150 | 13,600 | 270 | 46.90 |
| AFFINITY* GA 1900 | 28,944 | 14,757 | 7,390 | 18,600 | 8,670 | 2.15 |
| B5 | 614 | 344 | 187 | 7,570 | 280 | 27.04 |
| EPOLENE**N21 | 607 | 352 | 213 | 6,140 | 2,110 | 2.91 |

*Trademark of The Dow Chemical Company
**Trademark of The Eastman Chemical Company

TABLE 8

GPC and NMR Results of Solvent/Non-Solvent Fractionations of Two CAT 51 Batch Reactor Samples

| | M $M_w$ g/mol | M $M_n$ g/mol | M $M_w/M_n$ | D $M_w$ g/mol | D $M_n$ g/mol | D $M_w/M_n$ | Wt % Ethylene | Wt % Octene (mol %) | Vinyl/ 1000C | Cis/Trans Vinylene/ 1000C | Trisub. Unsat/ 1000C | Vinyl- idene/ 1000C | Rv |
|---|---|---|---|---|---|---|---|---|---|---|---|---|---|
| B4 | 13,600 | 270 | 46.9 | | | | NM | NM | 49.78 | 1.04 | 3.11 | 0.52 | 0.97 |
| B4 Low MW Fraction | 810 | 570 | 1.42 | 563 | 213 | 2.65 | 98.9 | 1.1 (0.3) | 24.07 | 0.25 | 1.72 | 0.25 | 0.98 |
| B4 High MW Fraction | 123,700 | 57,100 | 2.17 | 128,626 | 63,934 | 2.01 | 87.7 | 12.3 (3.4) | 0.09 | 0.13 | 0.13 | 0.02 | 0.35 |
| //////////// | /////// | /////// | ///////// | ///////// | ///////// | ////// | ///////// | /////// | ///// | ////// | ////// | ////// | ////// |
| B5 | 7,570 | 280 | 27.04 | | | | NM | NM | 48.50 | 1.00 | 2.00 | 0.00 | 0.98 |
| B5 Low MW Fraction | 960 | 730 | 1.32 | 599 | 238 | 2.51 | 99.1 | 0.9 (0.2) | 18.03 | 0.77 | 2.11 | 0.19 | 0.95 |
| B5 High MW Fraction | 316,600 | 99,400 | 3.19 | 330,352 | 164,555 | 2.01 | 95.5-93.5 | 4.5-6.5 (1.2-1.7) | 0.10 | 0.04 | 0.00 | 0.01 | 0.71 |

Figure 5:
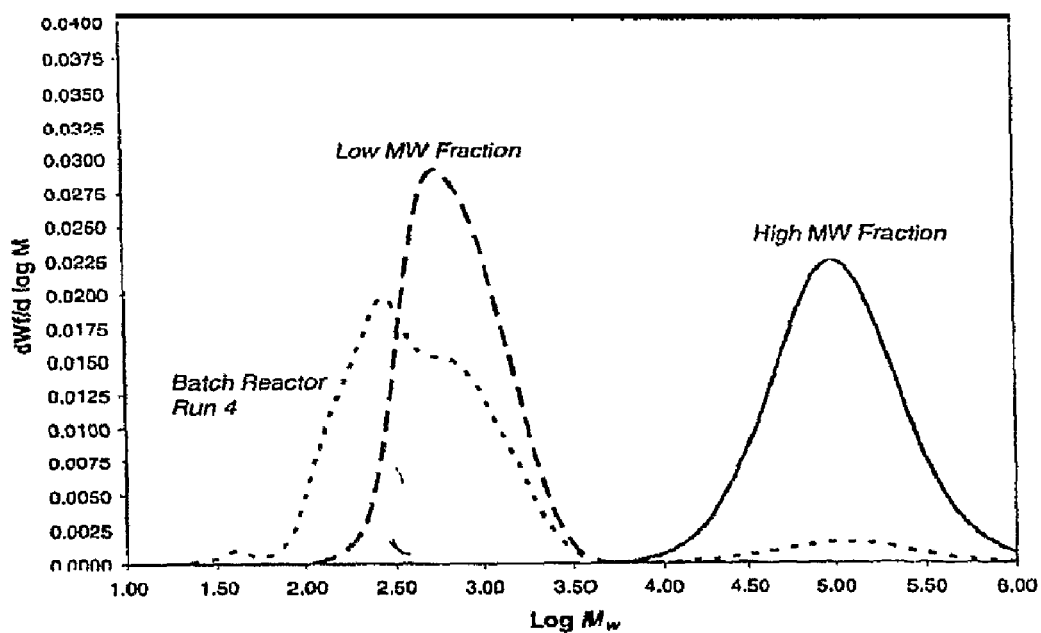
FIG. 5 depicts the GPC profile of sample B4 and of the two fractions of sample B4 as determined by solvent/nonsolvent fractionation.
Figure 6:
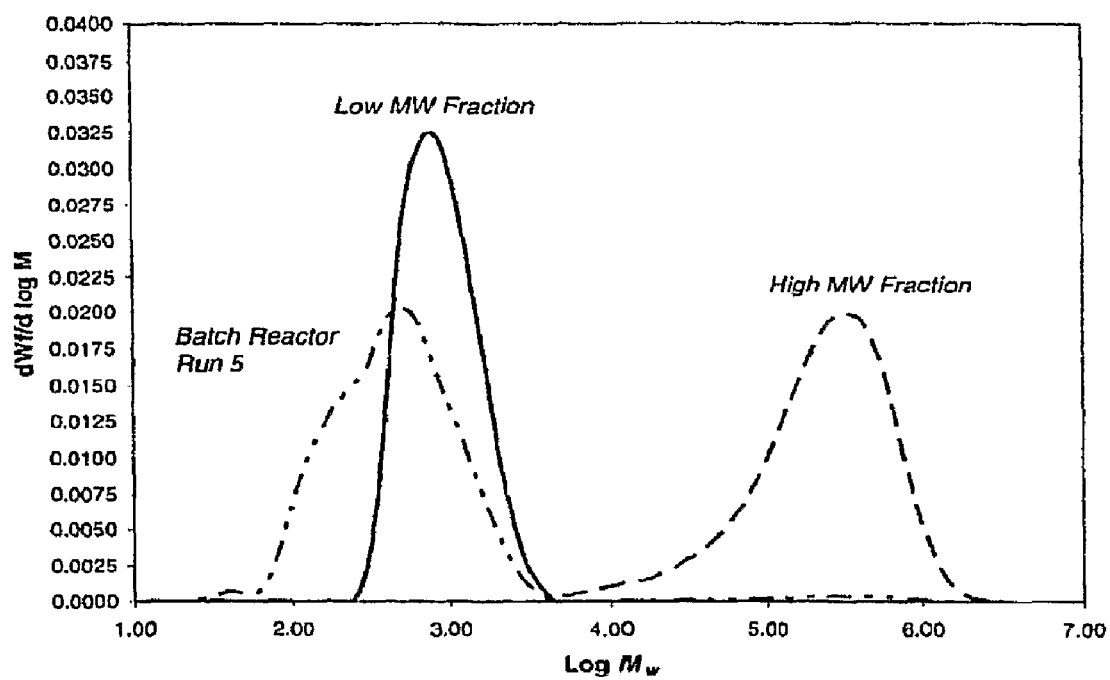
FIG. 6 depicts the GPC profile of sample B5 and of the two fractions of sample B5 as determined by solvent/nonsolvent fractionation.

M = Measured values from GPC profiles
D = Values obtained from the deconvolutions of the respective GPC profiles
Wt % Octene = Weight percent polymerized octene
Wt % Ethylene = Weight percent polymerized ethylene The GPC profiles of two fractions of each of Sample B4 and Sample B5, as determined by solvent/nonsolvent fractionation, along with the GPC of the whole polymer, are shown in FIGS. 5 and 6, respectively.

The GPC results of the two fractions, collected for each sample (as shown in Table 8 and FIGS. 5 and 6) compared well to those determined electronically by deconvolutions of the GPC of the original sample. The $^1$H NMR results show that the low molecular weight fractions had the highest levels of vinyl unsaturations, and as the major fractions, these vinyl levels are representative of the overall polymer. Interestingly, each high molecular weight fraction showed a reduction in vinyl chain ends, concurrent with an increase in vinylidene chain ends.

The $^{13}$C NMR results for the comonomer content of each of the fractions showed that little octene (~1 wt %) was incorporated into the low molecular weight fraction, and the majority of octene (5-12 wt %) was incorporated in the minor phase (~1-5%) high molecular weight fraction. These results are in agreement with the end group analysis results.

II. Ethylene-Octene Polymerization

Continuous Process

A. Representative Procedure (Continuous Process)

Purified ISOPAR-E solvent, ethylene, hydrogen, and 1-octene were supplied to a one gallon reactor, equipped with a jacket for temperature control, and an internal thermocouple. The 1-octene was mixed with the solvent stream. The catalyst component solutions were metered into the reactor using pumps and mass flow meters, and were combined with the catalyst flush solvent. The catalyst stream entered the bottom of the reactor, but in a different port than the monomer stream. The reactor was run, liquid full, at 450 psig, with vigorous stirring. The process flow direction was "in" from the bottom, and "out" from the top. Polymerization was stopped with the addition of a small amount of water, and no stabilizers or additives were added.

A summary of the process data from the continuous run is shown in Table 9. The values in this table represent the averages of the hourly production results.

TABLE 9

Process Summary from the Continuous Process for All Runs with CAT 51.

| Sample | Density (g/cc) | 1-Octene Flow (lb/hr) | Hydrogen (sccm) | % Conversion | Reactor Temperature (° C.) | TIBAL Ratio |
|---|---|---|---|---|---|---|
| R1 | 0.8773 | 7 | 60 | 92 | 130 | 5 |
| R1A | 0.9001 | 7 | 10 | 85 | 115 | 5 |

Figure 7:
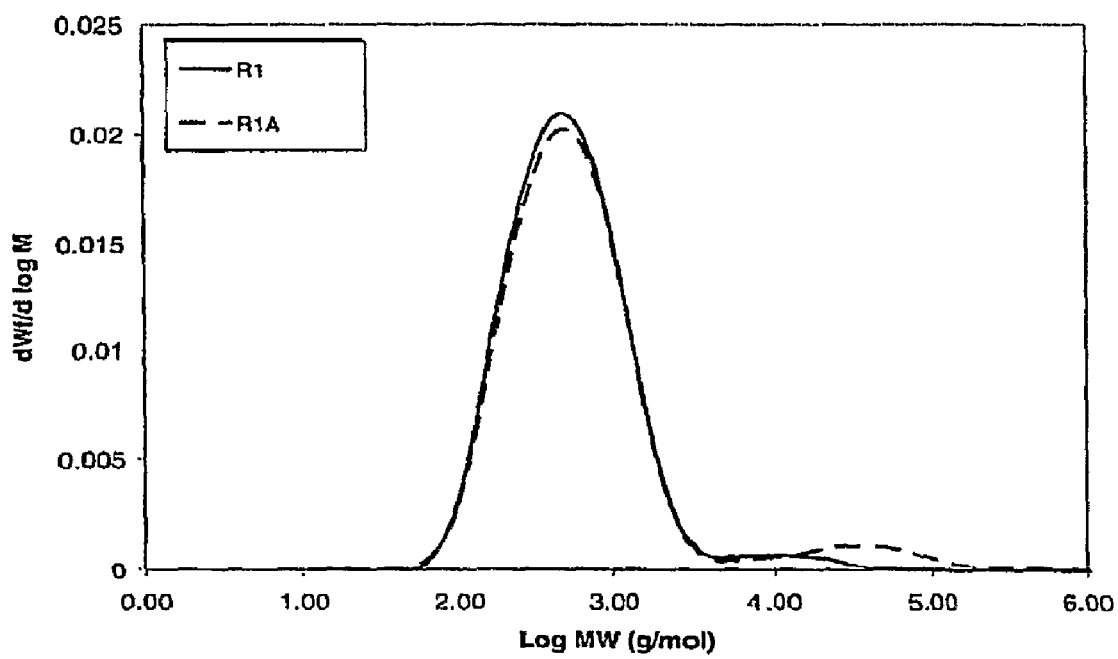
FIG. 7 depicts GPC profiles for two samples from a continuous polymerization process (samples R1 and R1A).
Figure 8:
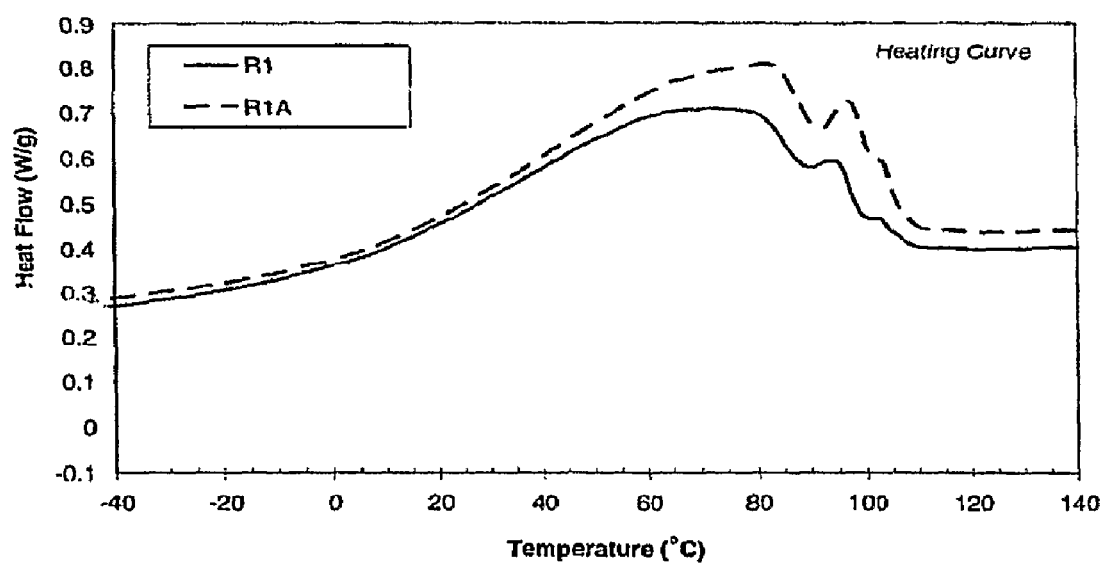
FIG. 8 depicts DSC profiles (heating) for two samples from a continuous polymerization process (samples R1 and R1A).

The low molecular weight capability of the CAT 51 system is exemplified in sample R1, where an "8 cP" (at 149° C.) material was made. The GPC profiles of the continuous process samples produced with CAT 51 are shown in FIG. 7. DSC heating curves for these samples are shown in FIG. 8.

The samples produced by the continuous process were of very low viscosity (8-30 cP at 149° C.). In contrast to the batch reactor samples, which were of higher crystallinity, the continuous process samples exhibited lower crystallinities (46-53%) and melting points (70-100° C.). The samples contained from 1 to 3.5% (wt %) of higher molecular weight components; the molecular weights of these minor components were lower (Mn ~5,900-14,000 g/mol) than the molecular weights of the corresponding components from the batch reactor studies (Mn ~32,000-212,000 g/mol). A summary of the viscosity and DSC characterization results are shown in Table 10, and a summary of the GPC characterization results are shown in Table 11.

TABLE 10

Summary of the Characterization Results using CAT 51 in a Continuous Process - Viscosity and DSC.

| Sample | Visc. (cP) @ 125° C. | Visc. (cP) @ 149° C. | Visc. (cP) @ 177° C. | Wt % Oct. (mol %) | Wt % Hex.* (mol %) | Density g/cc | Overall Mw g/mol | Overall Mn g/mol | Overall Mw/Mn | Tm1 ° C. | Tm2 ° C. | Heat of Fusion J/g | % Cryst. | Tc1 ° C. | Tc2 ° C. |
|---|---|---|---|---|---|---|---|---|---|---|---|---|---|---|---|
| R1 | 12 | 8 | 6 | 6.5 (1.7) | 2.7 (0.9) | 0.8877 | 1,010 | 350 | 2.89 | 69.4 | 94.2 | 134.6 | 46.1 | 85.3 | 68.4 |
| R1A | 47 | 30 | 18 | 5.1 (1.3) | 2.4 (0.8) | 0.8983 | 3,700 | 370 | 10.00 | 81.0 | 96.8 | 155.5 | 53.3 | 87.8 | 75.9 |

*The presence of 2-3 weight percent 1-hexene in the polymer resulted from contamination from a leaky valve that provided the 1-octene comonomer to the process.

TABLE 11

Summary of Characterization Results using CAT 51 in a Continuous Process - GPC.

| | GPC Data | | | Deconvolutions | | | | | | | | | |
|---|---|---|---|---|---|---|---|---|---|---|---|---|---|
| Sample | Overall M$_w$ (g/mol) | Overall M$_n$ (g/mol) | Overall M$_w$/M$_n$ | Overall M$_w$ (g/mol) | Overall M$_n$ (g/mol) | Overall M$_w$/M$_n$ | Low MW M$_w$ (g/mol) | Low MW M$_n$ (g/mol) | Low MW M$_w$/M$_n$ | High MW M$_w$ (g/mol) | High MW M$_n$ (g/mol) | High MW M$_w$/M$_n$ | % High MW |
| R1 | 1,010 | 350 | 2.89 | 1,042 | 366 | 2.85 | 609 | 271 | 2.25 | 11,805 | 5,913 | 2.00 | 1.02 |
| R1A | 3,700 | 370 | 10.00 | 3,813 | 382 | 9.98 | 623 | 276 | 2.26 | 33,117 | 14,163 | 2.34 | 3.52 |

C. Fractionation

Figure 9:
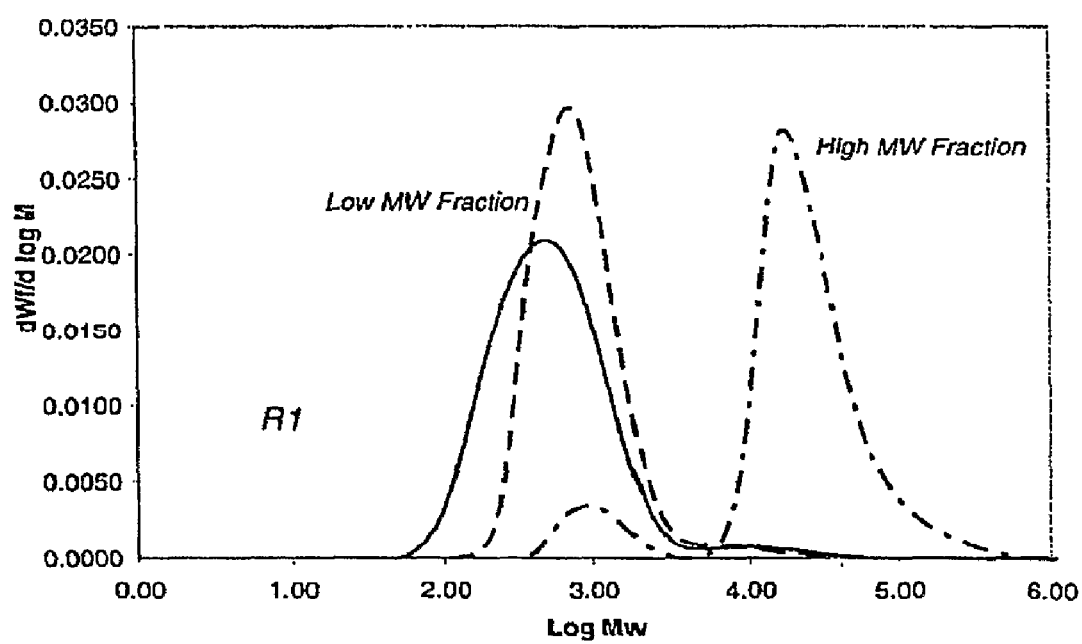
FIG. 9 depicts GPC profiles of sample R1 from a continuous polymerization and of the fractions of sample R1 from solvent/nonsolvent fractionation.
Figure 10:
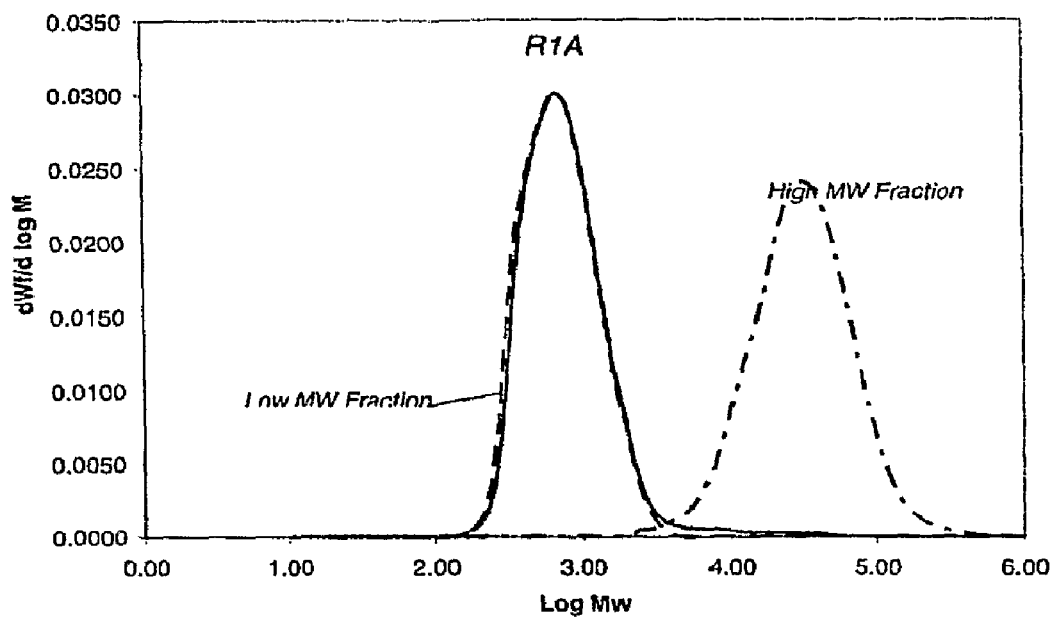
FIG. 10 depicts GPC profiles of sample R1A from a continuous polymerization and of the fractions of sample R1A from solvent/nonsolvent fractionation.

In order to verify the short chain branching distribution between low and high molecular weight fractions, the two continuous process samples were fractionated. The continuous process samples also show a reduction in the percentage of vinyl chain ends, and an increase in the vinylidene chain ends, in the high molecular weight fractions (see Table 12 below). These results were similar to what was seen for the batch reactor samples (see Table 8). GPC profiles of two fractions of continuous process samples, along with the GPC of the whole polymer, are shown in FIGS. 9 and 10, respectively.

tion 1, below. The silane graft may also occur on an internal or terminal unsaturation group.

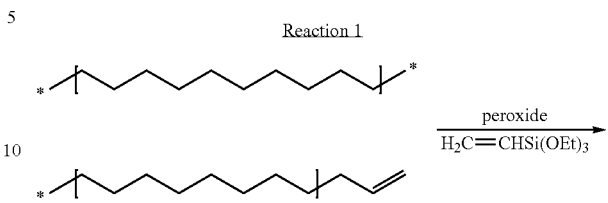

Reaction 1

TABLE 12

| | GPC and NMR Results of Fractionations of Two CAT 51 Continuous Process Samples | | | | | | | | | | | |
|---|---|---|---|---|---|---|---|---|---|---|---|---|
| | Measured | | | From Deconvolutions | | | Wt % | Wt % | | Cis/Trans | Trisub. | Vinyl- | |
| Sample | $M_w$ g/mol | $M_n$ g/mol | $M_w/M_n$ | $M_w$ g/mol | $M_n$ g/mol | $M_w/M_n$ | Octene (mol %) | Hexene (mol %) | Vinyl/ 1000C | Vinylene/ 1000C | Unsat/ 1000C* | idene/ 1000C | Rv |
| R1 | 1,010 | 350 | 2.89 | 1,042 | 366 | 2.85 | 6.5 (1.7) | 2.7 (0.9) | 27.60 | 10.40 | 0.80 | 2.00 | 0.69 |
| R1 Low MW Fraction | 1,110 | 630 | 1.76 | 609 | 271 | 2.25 | 5.1 (1.3) | 2.2 (0.7) | 18.22 | 3.33 | 0.00 | 0.67 | 0.82 |
| R1 High MW Fraction | 33,600 | 6,860 | 4.90 | 11,805 | 5,913 | 2.00 | 11.8 (3.2) | 8.7 (3.1) | 1.22 | 0.82 | 0.53 | 0.00 | 0.60 |
| R1A | 3,700 | 370 | 10.00 | 3,813 | 382 | 9.98 | 5.1 (1.3) | 2.4 (0.8) | 30.27 | 5.68 | 0.76 | 1.89 | 0.80 |
| R1A Low MW Fraction | 800 | 590 | 1.36 | 623 | 276 | 2.26 | 4.6 (1.2) | 1.8 (0.6) | 20.41 | 2.85 | 0.00 | 0.71 | 0.85 |
| R1A High MW Fraction | 40,400 | 21,500 | 1.88 | 33,117 | 14,163 | 2.34 | 18.4 (5.3) | 7.8 (2.7) | 0.31 | 0.18 | 0.00 | 0.16 | 0.47 |

*Trisubstituted unsaturation per 1000C

III. Silane Functionalization of Continuous Process Sample

The silane-grafted samples were prepared in a 69 ml Haake bowl preheated to 80° C., and with rotors turning at 40 rpm. First, 35.68 g (~90%) of polymer was added, and allowed to soften or melt. Once this occurred, the vinyltriethoxysilane (VTES) was added at 5 ml (or 3.96 g at ~10% weight solution). Then 4 drops of Luperox 101 was added at 1000-1200 ppm. The ram was sealed, and the temperature was raised to 180° C. Once the melt temperature reached 180° C., the reaction was allowed to continue for 15 minutes. After this time, the temperature was lowered. When the melt temperature reached ~85° C., the bowl was opened, and the "slush" sample was removed, and pressed between Mylar, and submitted for FTIR analysis for silane. The two polymers silanated in this manner were a low molecular weight polymer (Sample C1), prepared, as described in U.S. Pat. Nos. 5,272,236 and 5,278,272, and having relatively low vinyl levels; and a continuous reactor sample (Sample R1) of comparable viscosity and density, produced with relatively high vinyl levels. Representative silane grafting reactions via hydrogen abstraction on the polyethylene backbone is shown in Reac- -continued

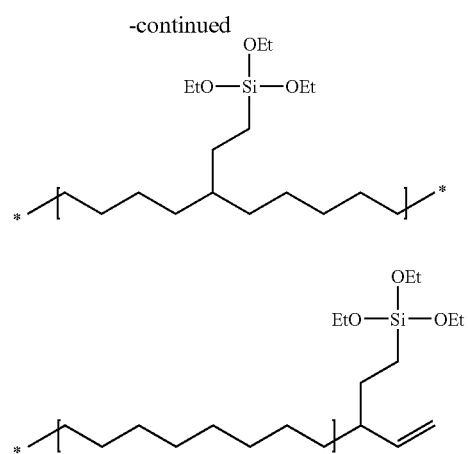

The vinyl terminated sample showed an improvement in graft efficiency (40%) over the comparative sample (23%). Generally, it is expected that the grafting efficiency of the inventive resin would be slightly higher in a large scale process (30-45%). This better grafting efficiency would result in a reduction in reaction waste stream, which, in turn, would result in further cost savings. Other advantages include the production of very low viscosity materials on the order of 10 cP, at 149° C., and the production of enhanced processable materials as compared to unimodal materials. In addition, a small amount of high molecular weight component could provide benefits in terms of enhanced fiber tear or peel, or higher shear adhesion fail temperatures in hot melt adhesive formulations. Table 13 provides a comparison of base properties of CAT 51 sample (R1, 0.69 mole vinyl/chain) and comparative sample (C1, 0.23 mole vinyl/chain) used in silane functionalization.

TABLE 13

Comparison of Base Properties of CAT 51 (R1) and Comparative Sample (C1) used in Silane Functionalization.

| Sample | Viscosity (cP) @ 125° C. | Viscosity (cP) @ 149° C. | Viscosity (cP) @ 177° C. | Wt % Octene (mol %) | Density (g/cc) | $M_w$ (g/mol) | $M_n$ (g/mol) | $M_w/M_n$ |
|---|---|---|---|---|---|---|---|---|
| R1 | 12.0 | 8.4 | 5.9 | 6.5 (1.7) | 0.8877 | 1,010 | 350 | 2.89 |
| C1 | 14.1 | 9.2 | 6.3 | 15.2 (4.3) | 0.8973 | 1,030 | 580 | 1.78 |

| Sample | $T_{m1}$ (° C.) | $T_{m2}$ (° C.) | Heat of Fusion (J/g) | % Cryst. | $T_{c1}$ (° C.) | $T_{c2}$ (° C.) | % VTES Incorporated | % Graft Efficiency |
|---|---|---|---|---|---|---|---|---|
| R1 | 69.4 | 94.2 | 134.6 | 46.1 | 85.3 | 68.4 | 3.9 | 39.4 |
| C1 | 80.6 | 98.2 | 149.0 | 51.0 | 89.4 | 78.2 | 2.3 | 22.7 |

IV. Percent Crystallinity Versus Density of the Continuous Process Samples

The inventive interpolymers show a different density/crystallinity behavior due to the unique distribution of comonomer in the interpolymers. The density/crystallinity behavior of the samples produced in the continuous process were compared to the density/crystallinity behavior of low molecular weight comparative examples, prepared in similar fashion, as described in U.S. Pat. Nos. 5,272,236 and 5,278,272, each incorporated herein by reference in its entirety.

Figure 11:
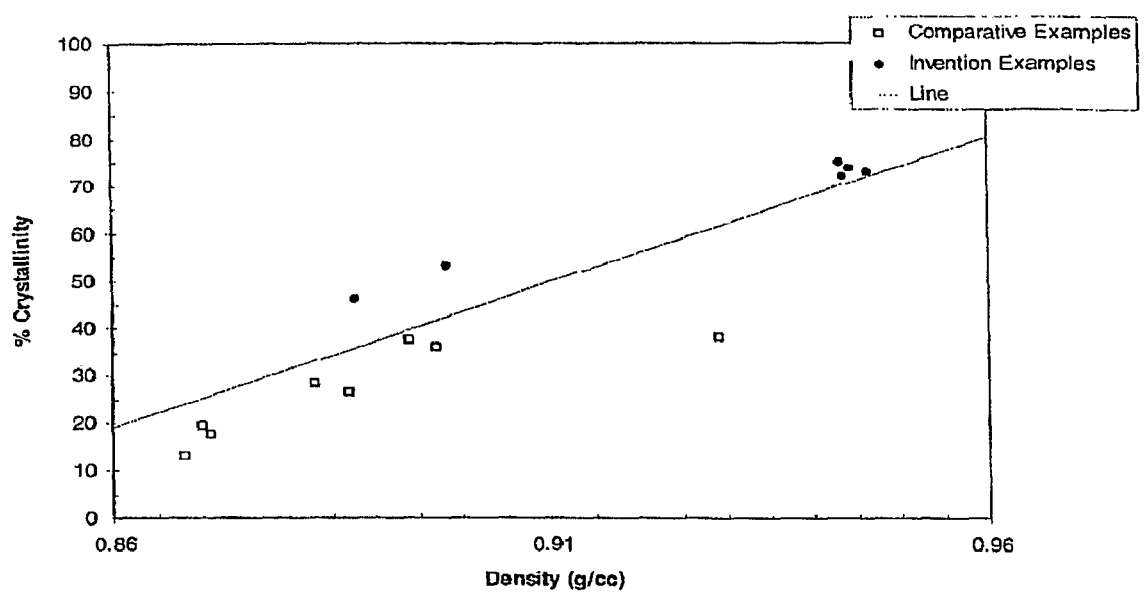
FIG. 11 depicts a plot of "Percent Crystallinity vs. Density" for two inventive resins and several comparative resins (as described in U.S. Pat. No. 6,054,544).

Plots of "percent crystallinity versus density" are shown in FIG. 11. As seen from the line correlation in FIG. 11, the percent crystallinity of the inventive samples can be determined from the following relationship:

$$\text{Percent Crystallinity} > 614 * (\text{density in g/cc}) - 509,$$

where the percent crystallinity is the ((heat of fission in J/g)/(292 J/g for polyethylene))*100, where the heat of fusion is determined from a second heat curve of a DSC. Density is the density of the sample. Each sample contained polymer; however, a sample may contain one or more stabilizers.

While the invention has been described with respect to a limited number of embodiments, these embodiments are not intended to limit the scope of the invention as otherwise described and claimed herein.

What is claimed is:

1. A composition comprising at least one low molecular weight (LMW) ethylene interpolymer, and at least one high molecular weight (HMW) ethylene interpolymer, and wherein the composition has a melt viscosity from 1 to 30,000 cP at 177° C., and wherein the sum of the Rv from the low molecular weight interpolymer and the high molecular weight interpolymer is from 0.3 to 2.

2. The composition of claim 1, wherein the at least one low molecular weight (LMW) ethylene interpolymer has a molecular weight distribution, Mw/Mn, from 1 to 5, and the at least one high molecular weight (HMW) ethylene interpolymer has a molecular weight distribution, Mw/Mn, from 1 to 10.

3. The composition of claim 1, wherein the at least one low molecular weight (LMW) ethylene interpolymer has a weight average molecular weight from 100 to 5,000, and the at least one high molecular weight (HMW) ethylene interpolymer has a weight average molecular weight from 10,000 to 1,000,000.

4. The composition of claim 1, wherein the at least one high molecular weight (HMW) ethylene interpolymer has a weight average molecular weight from 10,000 to 600,000.

5. The composition of claim 1, wherein the at least one low molecular weight (LMW) ethylene interpolymer has a number average molecular weight from 100 to 1,000, and the at least one high molecular weight (HMW) ethylene interpolymer has a number average molecular weight from 5,000 to 50,000.

6. The composition of claim 1, wherein the at least one high molecular weight (HMW) ethylene interpolymer has a number average molecular weight from 5,000 to 300,000.

7. The composition of claim 1, wherein the at least one low molecular weight (LMW) ethylene interpolymer has an Rv from 0.8 to 0.98, and the at least one high molecular weight (HMW) ethylene interpolymer has an Rv from 0.2 to 0.8.

8. The composition of claim 1, wherein the ratio of the "Rv of the at least one low molecular weight (LMW) ethylene interpolymer" to the "Rv of the at least one high molecular weight (HMW) ethylene interpolymer" is from 1:1 to 5:1.

9. The composition of claim 1, wherein the at least one low molecular weight (LMW) ethylene interpolymer contains from 0.2 weight percent to 20 weight percent of at least one comonomer, and the at least one high molecular weight (HMW) ethylene interpolymer contains from 0.1 weight percent to 40 weight percent of at least one comonomer.

10. The composition of claim 9, wherein for both the LMW interpolymer and the HMW interpolymer, each comonomer is independently selected from the group consisting of propylene, 1-butene, 1-pentene, 1-hexene, 3-methyl-1-pentene, 4-methyl-1-pentene, 1-heptene, 1-octene, 1-nonene and 1-decene.

11. The composition of claim 1, wherein the at least one low molecular weight (LMW) ethylene interpolymer has a lower percentage of comonomer incorporation than the at least one high molecular weight (HMW) ethylene interpolymer.

12. The composition of claim 1, wherein the composition comprises less than, or equal to, 10 weight percent of the high molecular weight (HMW) ethylene interpolymer, based on the total weight of the composition.

13. An article comprising at least one component formed from the composition of claim 1.

14. The composition of claim 1, wherein the composition has a total percent crystallinity according to the following inequality:

percent crystallinity>614*(density in g/cc)−509, wherein the percent crystallinity is the ((heat of fusion in J/g)/(292 J/g for polyethylene))*100, and wherein the density is that of the composition.

* * * * *